United States Patent [19]

Kanda et al.

[11] Patent Number: 4,593,323

[45] Date of Patent: Jun. 3, 1986

[54] FACSIMILE SYSTEM CONTROL APPARATUS

[75] Inventors: Hajime Kanda, Ayase; Katsuo Murase, Tokyo; Hiroshi Hishida, Sagamihara; Eiichi Adachi, Atsugi; Yoshinori Wada, Miura; Yuji Koseki, Tokyo, all of Japan

[73] Assignee: Ricoh Company, Ltd., Japan

[21] Appl. No.: 366,579

[22] Filed: Apr. 8, 1982

[30] Foreign Application Priority Data

Apr. 9, 1981 [JP] Japan .................................. 56-53553
Apr. 20, 1981 [JP] Japan .................................. 56-59566

[51] Int. Cl.$^4$ ............................................. H04N 1/00
[52] U.S. Cl. .................................... 358/256; 364/200; 364/900
[58] Field of Search ................. 358/256, 257, 264; 364/200 MS File, 900 MS File

[56] References Cited

U.S. PATENT DOCUMENTS 4,171,539 10/1979 Tawfik et al. ...................... 364/900
4,204,249  5/1980 Dye et al. ........................... 364/200
4,405,951  9/1983 Omori et al. ....................... 358/256

FOREIGN PATENT DOCUMENTS 137775 10/1980 Japan .................................. 358/256

OTHER PUBLICATIONS

Tanaka et al–High-Speed Digital Facsimile of-22-00–Nat. Tech. Report, vol. 24, No. 4, Aug. 1978, pp. 617-633.

Primary Examiner—Joseph A. Orsino, Jr.
Attorney, Agent, or Firm—Guy W. Shoup

[57] ABSTRACT

The present facsimile machine comprises a system control unit, including a pair of central processing units (CPU's), and main and auxiliary power supplies. In one embodiment of the present invention, the second (slave) CPU receives power from the auxiliary power supply to constantly monitor the facsimile system. Upon receipt of a predetermined signal, the second CPU causes the main power supply turned on to render the first (master) CPU operative, thereby the second CPU becomes functionally dependent upon the first CPU. In another embodiment of the present invention, various functions of the facsimile machine are shared by the two CPU's. That is, one CPU is directed to control the communication-related functions with the other CPU directed to control the mechanism-related functions.

10 Claims, 24 Drawing Figures

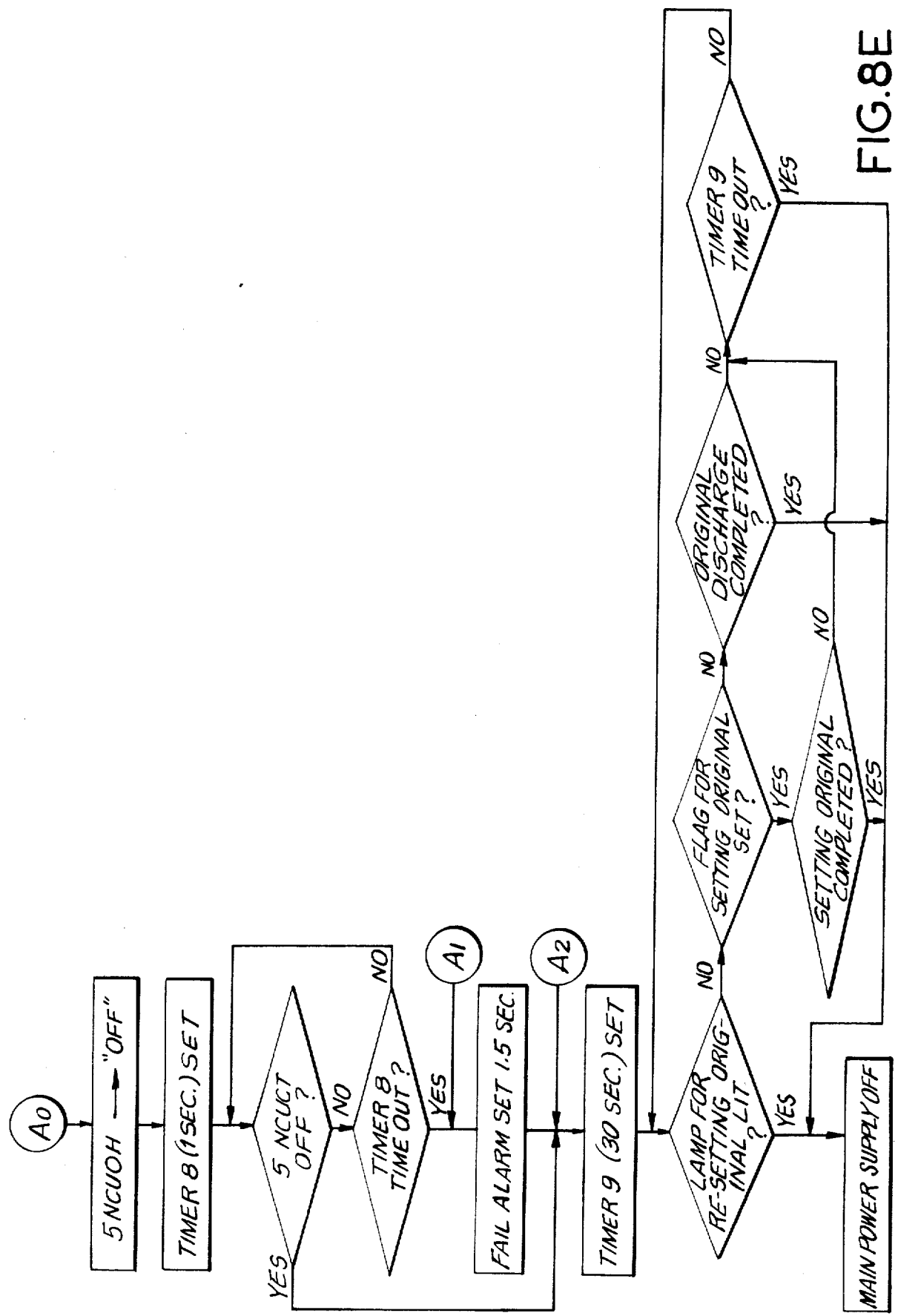

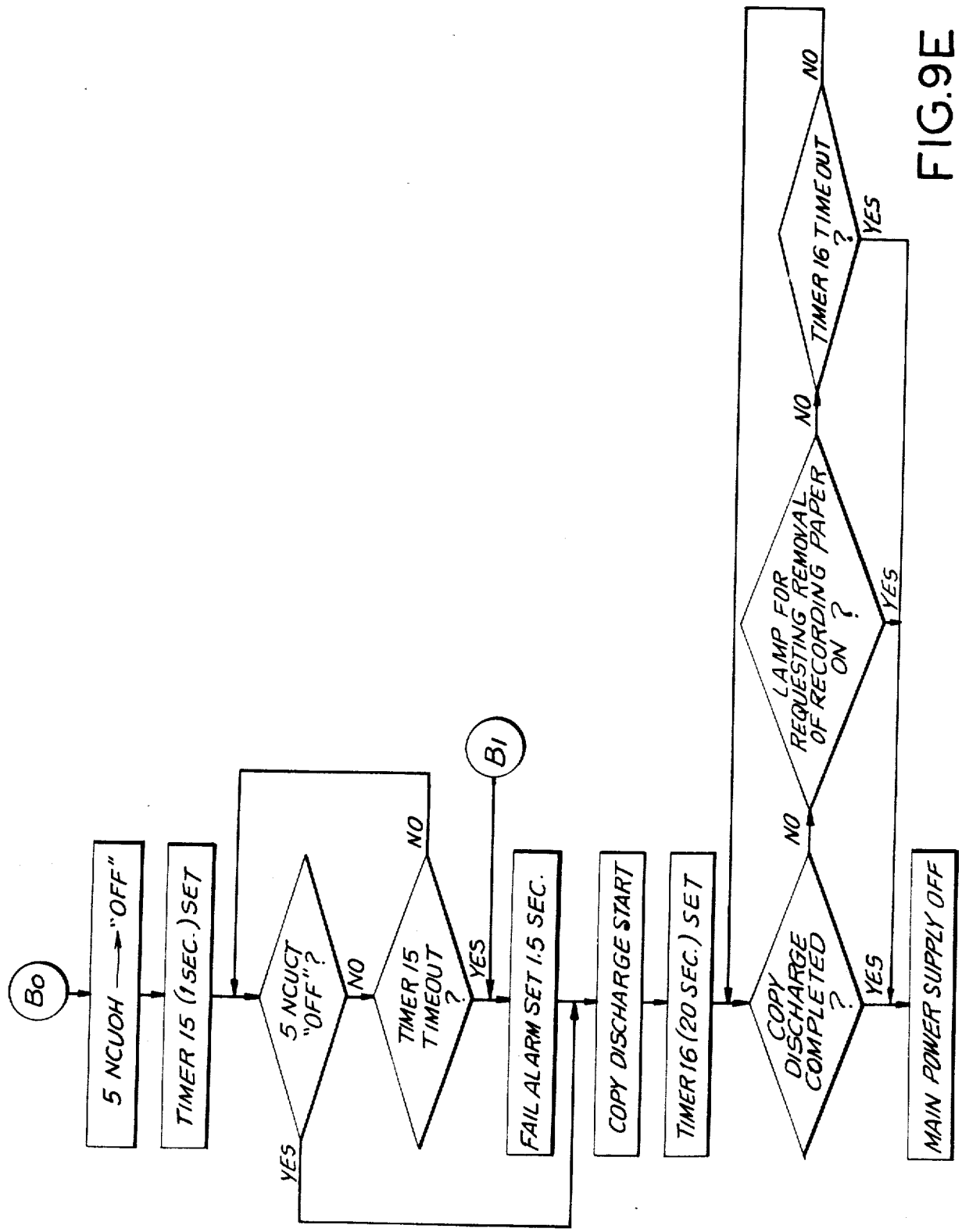

FACSIMILE SYSTEM CONTROL APPARATUS

BACKGROUND OF THE INVENTION

1. Field of the Invention

This invention generally relates to a facsimile machine for use in a facsimile communication system for transmitting or receiving image signals as carried through a transmission line such as the public telephone line. More in particular, this invention relates to a facsimile system control apparatus for controlling the power supply mode of a facsimile system depending upon the operating condition thereof.

2. Description of the Prior Art

In a facsimile system, the condition of the system in a stand-by state must be constantly monitored. However, power consumption increases excessively if a full power is supplied from a power supply such as a commercial power line while the facsimile system is in a stand-by state; on the other hand, a detailed observation of the condition of the system cannot be carried out if the system is completely disconnected from a power supply. Prior art facsimile systems used a so-called automatic power supply operating system in which only an auxiliary power supply is activated during a stand-by state and a full power is applied at the time of transmitting or receiving operation. In such prior art facsimile systems, use was made of a simple hardware logic means to detect an instruction signal to start transmission or reception of image signals or a telephone calling signal thereby establishing the application of a full power.

However, such an automatic power supply operating system is not satisfactory in observing or monitoring the condition of the facsimile system in a stand-by state. For example, in a stand-by state with only an auxiliary power supply on after turning-on of a power switch, presence of paper midway in the scanning or recording section cannot be detected. Such a faulty condition can only be detected upon application of a full power at the time of initiation of transmission or reception of image signals. For this reason, an operator is not capable of sensing the presence of such a faulty condition until a transmitting or receiving operation has been initiated.

In order to cope with the above-mentioned problem, it is necessary to carry out a satisfactory observation of the condition of the facsimile system in a stand-by state. However, this tends to increase the amount of hardware and power consumption in a stand-by state in a prior art facsimile system, which is also disadvantageous.

SUMMARY OF THE INVENTION

The disadvantages of the prior art are overcome and an improved facsimile system capable of functioning satisfactorily both in stand-by and normal transmitting-/receiving states is provided.

In accordance with one aspect of the present invention, there is provided an apparatus for controlling a facsimile system comprising a main power supply, an auxiliary power supply, a first central processing unit (CPU) to which power is supplied from said main power supply during the operation of transmitting or receiving image signals and a second central processing unit (CPU) to which is normally supplied power from said auxiliary power supply, whereby said second CPU monitors the condition of the facsimile system while it is in a stand-by state and in response to a command signal for the initiation of transmission or reception of image signals or a telephone calling signal, said second CPU establishes a connection to said main power supply thereby making said second CPU functionally dependent upon said first CPU; whereas, upon completion of the transmitting or receiving operation, said second CPU causes said main power supply disconnected in response to an instruction signal supplied from said first CPU, thereby reestablishing the monitoring mode.

Furthermore, in accordance with another aspect of the present invention there is provided a facsimile machine for transmitting or receiving image signals through a transmission line connected thereto which comprises a main power supply; an auxiliary power supply; a first central processing unit (CPU) which receives power from said main power supply during the transmitting or receiving operation for controlling the operation of data communication; and a second central processing unit (CPU) which normally receives power from said auxiliary power supply for controlling the operation of the mechanism of said machine.

Therefore it is an object of the present invention to provide an apparatus for controlling a facsimile system which allows to carry out a satisfactory monitoring operation while the system is in a stand-by state without increasing power consumption.

Another object of the present invention is to provide a facsimile machine having a system control unit which comprises a pair of central processing units (CPU's) which have different functions.

A further object of the present invention is to provide a facsimile machine which is highly adaptable to different conditions with requiring only a minimum amount of modifications.

A still further object of the present invention is to improve the performance of a facsimile machine without significant increase in the number of parts and keeping the whole machine compact in size.

Other objects, advantages and novel features of the present invention will become apparent from the following detailed description of the invention when considered in conjunction with the accompanying drawings.

DESCRIPTION OF THE PREFERRED EMBODIMENTS

Figure 1:
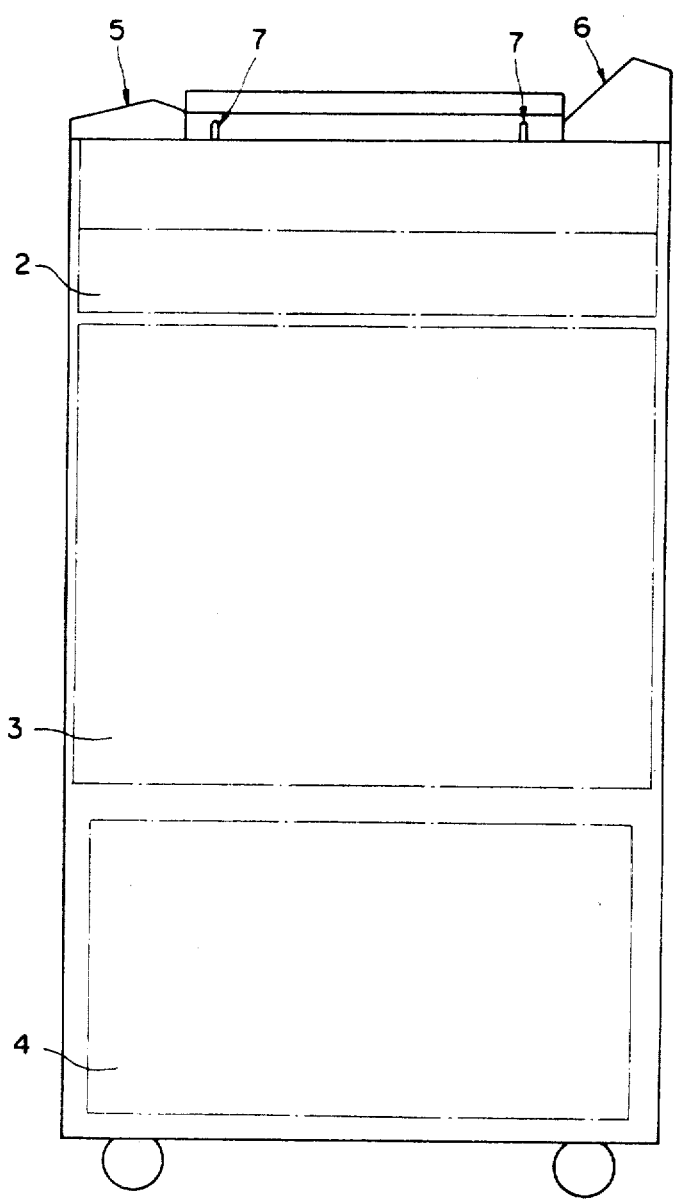
FIG. 1 is a front view showing the outside appearance of a facsimile machine to which the present invention is embodied.
Figure 2:
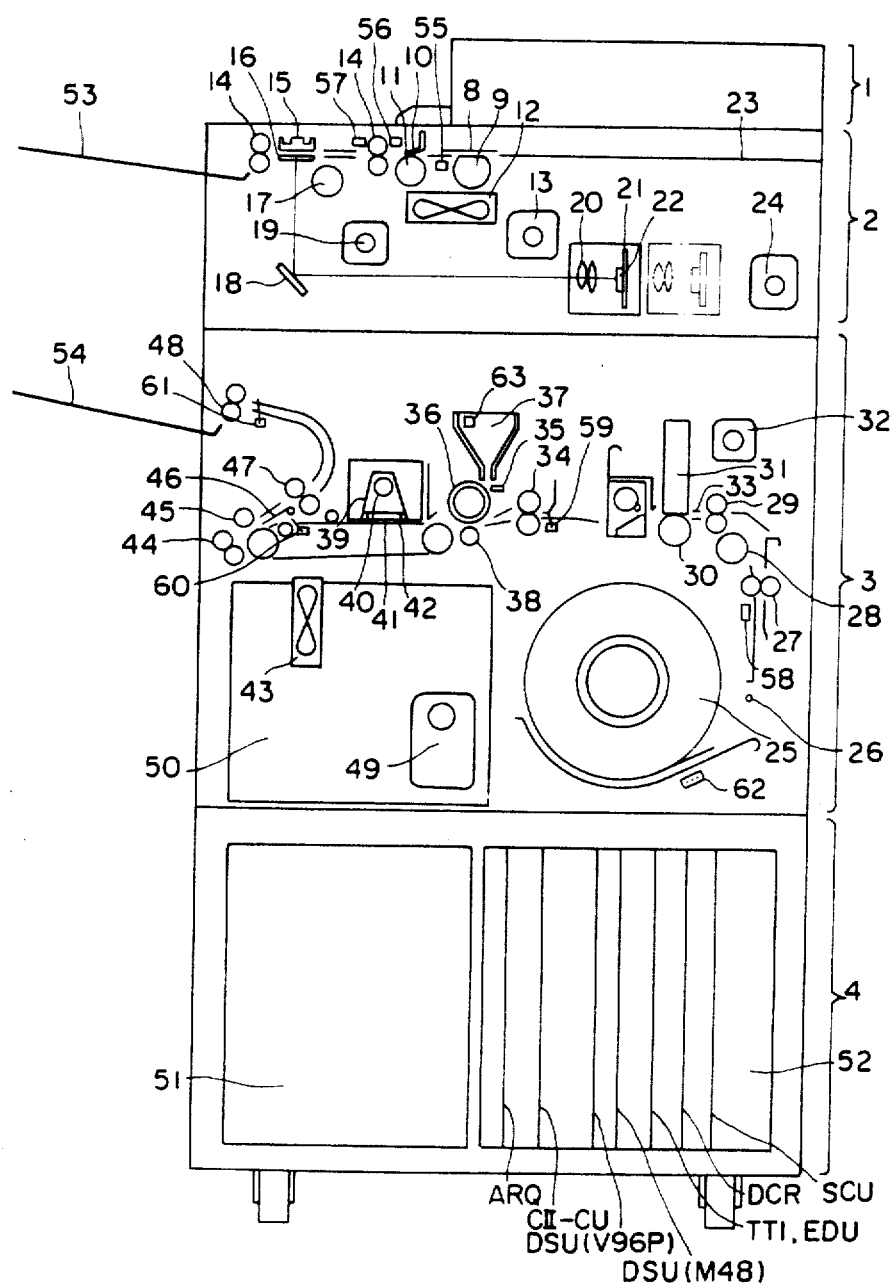
FIG. 2 is a schematic illustration showing the inside structure of the facsimile machine of FIG. 1.

Referring to FIGS. 1 and 2, a facsimile machine generally comprises an operating section 1, an automatic document feeding (ADF) and scanning section 2, a recording or plotter section 3, and a control power supply section 4, which are all contained in a machine housing. On top of the machine are provided a main control panel 5 which includes operating buttons and indicator lamps which are associated with transmitting and receiving operation and an auxiliary control panel 6 which includes other operating switches and indicator lamps than those associated with data communication. A pair of guide plates 7 are provided on the top surface for guiding an original document.

As shown in FIG. 2, an opening 8 is provided for allowing an original document to be fed into the scanner of the machine. A feed roller 9 is disposed in the vicinity of the opening 8 for feeding the bottom-most document from a stack of documents. A rubber separator 10 is disposed in contact with the peripheral surface of a separator roller 11 which cooperate together to separate and transport one document from the stack. Disposed below the rollers 9 and 11 are a suction fan 12 for attracting the bottom-most document of the stack in the downward direction and a motor 13 for driving the automatic document feeder comprised of the above-mentioned elements.

A scanner feed roller 14 for transporting the document is disposed adjacent to a pressure plate 15 which presses the document against a contact glass 16 disposed therebelow. Also provided are a fluorescent lamp 17 for illuminating the document, a reflecting mirror 18 for directing the light image from the document to a desired location and a driving motor 19, preferably a pulse motor, for transporting the original.

A lens 20 is disposed to receive the light reflected from the mirror 18 and to focus it onto a CCD image sensor 22, where the light image from the document is converted into electrical signals, which is mounted on a board 22 provided with electrical circuits associated with the CCD image sensor 22. A table 23 is provided to place thereon a stack of original documents. Below the table 23 is disposed a reduction motor 24 which is used to move elements such as the CCD image sensor 22 when the size of the original document is to be reduced.

A roll 25 of electrostatic recording paper is provided approximately at the center of the machine and a guide roller 26 for guiding the supply of paper is disposed in the vicinity of the roll 25. Above the guide roller 26 is disposed a transporting or manual feed roller 27 which is to be used at the time of setting the recording paper in position. In the downstream of the roller 27 is disposed a tension roller 28 which is resiliently biased against the recording paper in position.

A recording feed roller 29 is disposed upstream of a one-sided recording stylus 31 and it feeds the recording paper during the recording operation by the stylus 31. As shown, a counter roller 30 is disposed as opposed to the stylus 31 for bringing the recording paper in close contact with the stylus 31. A pulse motor 32 is provided and it is used to advance the recording paper during a recording operation. Disposed immediately upstream of the stylus 31 is a cutter unit 33 for cutting the recording paper to an appropriate size. In the downstream of the stylus 31 is disposed a feed roller 34 which transports the recording paper to a developing station which includes a magnet roller 36 for carrying thereon a layer of toner particles, a doctor blade 35 for regulating the thickness of the layer of toner particles adhering to the roller 36, a hopper 37 for containing therein a quantity of toner particles and a gap roller 38 for bringing the recording paper into a close contact with the toner particles on the roller 36.

A reflector plate 39 is disposed above a xenon lamp 40 which constitutes a light source for fixing the toner image to the recording paper. The fixing section also includes a protective glass 41 which prevents the reflector plate 39 and the lamp 41 from being stained. A transporting belt 42 is provided as extended between a pair of rollers for transporting the recording paper through the fixing section. A suction/cooling fan 43 is disposed below the belt 42 for attracting the recording paper to the belt 42 and for cooling the fixing section. A paper discharge switching roller 44 is disposed at the downstream end of the belt 42 for transporting the paper and it merely functions as a paper discharge roller if the paper is not to be inverted. Interposed between the belt 42 and the roller 44 is an inversion switching roller 45 which is used if the paper is to be inverted. Also provided are an inversion switching plate 46 for switching the passages of the recording paper and an inversion transport roller 47 for transporting the inverted recording paper to a copy tray 54 via a paper discharge roller 48. Moreover, a driving motor 49 for driving the plotter section 3 is also provided.

To the left of the paper roll 25 is disposed a power supply which supplies power to the xenon lamp 39. At the bottom of the machine are disposed a controlling power supply 51 which is a main power supply of the machine and a control circuit section 52 which contains a control circuit for the facsimile system. At top left of the machine in FIG. 2 is disposed a tray 53 for stacking thereon original documents after scanning. A plurality of sensors 55 through 63 are disposed at appropriate locations within the machine housing as shown in FIG. 2 such as sensor 55 for detecting the presence or absence of a document in the automatic document feeder; sensor 56 for detecting the document to drive the scanner feed roller 14; sensor 57 for detecting the fact that the document has been transported to the scanning section; sensor 58 for detecting the presence or absence of recording paper; sensor 59 for detecting the fact that the recording paper has been transported to the position in front of the developing section; sensor 60 for controlling the timing in inverting the recording paper; sensor 61 for detecting the fact that the recording paper has been discharged; sensor 62 for detecting the remaining amount of the paper roll 25; and sensor 63 for detecting the amount of toner particles contained in the hopper 37.

Figure 3:
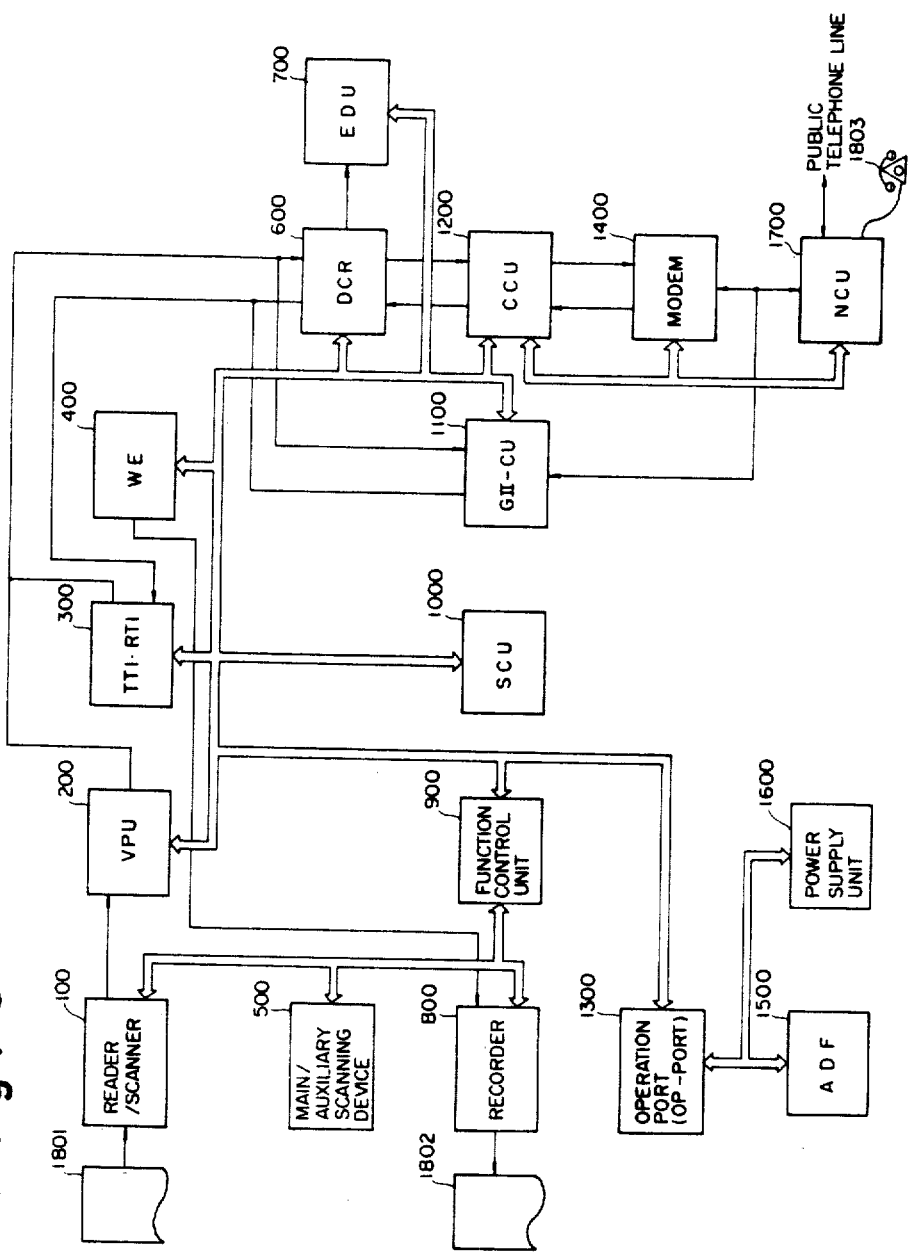
FIG. 3 is a block diagram showing one example of the basic facsimile system which constitutes a part of the facsimile machine shown in FIG. 2.

FIG. 3 shows one example of the fundamental structure in blocks of a facsimile system and it includes a recoder or scanner 100, a video processing unit or VPU 200, a transmitting terminal identification generator/receiving terminal identification generator or TTI/RTI 300, a write enable unit or WE 400, a main/auxiliary scanning device 500, a data coding/decoding unit or DCR 600, a two-dimensional coding/decoding unit or EDU 700, a recoder 800, a function or mechanism control unit 900, a system control unit or SCU 1,000, a GII machine compatible unit or GL - CU 1,100, a communication control unit or CCU 1,200, an operation port or OP - PORT 1,300, a MODEM 1,400, an automatic document feeder or ADF 1,500, a power supply unit 1,600, and a network control unit or NCU 1,700. Also shown in FIG. 3 are a transmitting original document 1,801 which is scanned by the scanner 100, a receiving copy 1,802 which is recorded by the recorder 800 and a telephone 1,803 which controls the connection between the facsimile system of FIG. 3 and a transmission line such as the public telephone line. Interconnections among the above-mentioned various elements are shown partly by single lines which carry data signals and partly by double lines which carry control signals.

The scanner 100 includes an illuminating system and an optical system and it scans the original document 1,801 to convert light image information into an electrical image signal, which is then supplied to the VPU 200. The main/auxiliary scanning device 500 is operatively associated with the scanner 100 and in the case where use is made of a stylus recorder, the device 500 is only comprised of a paper feeding mechanism. The recorder 800 is a unit which converts image signals supplied from WE 400 into a visible, reproduced image and thus it contains developing and fixing units. TTI/RTI 300 is a unit which supplies identification information as a transmitter if the system is in a transmitting mode or as a receiver in a receiving mode, and the information includes such data as identification of the facsimile machine, time of start of communication and time of end of communication.

DCR 600 is a unit which carries out compression of data to be transmitted by a one-dimensional coding technique such as the Modified-Hoffmann method in order to eliminate redundancy in image information or decompression of data received. On the other hand, EDU 700 is a unit which carries out two-dimensional coding or decoding. CCU 1,200 is a communication control unit which executes a facsimile control procedure in accordance with the instruction supplied from SCU 1,000. As is well known, MODEM 1,400 is to modulate coded, binary image information into a signal suitable for transmission through a transmission line connected thereto and to demodulate the received image information. NCU 1,700 is an interface with the transmission line and it has such functions as holding of a transmission line and detection of a calling tone. GII -CU 1,100 includes a GII MODEM based on the CCITT standards and it carries out modulation and demodulation of three-valued data. Moreover, function or mechanism control unit 900 is a unit for controlling the operation of various structural parts of the facsimile machine and it drives such structural parts as scanner 100, main/auxiliary scanning device 500 and recorder 800 in response to instructions supplied from SCU 1,000. On the other hand, SCU 1,000 is a unit for controlling the operation of the facsimile system which includes the above-mentioned various elements and it controls the over-all operation of the facsimile machine. Lastly, the operation port 1,300 is a unit which transmits an operator's switch operation or button depression to SCU 1,000 and it indicates to the operator as to the operating mode or condition of the facsimile machine.

In accordance with a first embodiment of the present invention, the system control unit 1,000 includes a pair of central processing units (CPU's), i.e., a master CPU to which power is supplied from a main power supply during a transmitting or receiving operation and a slave CPU to which power is supplied from an auxiliary power supply while the facsimile system is in a stand-by state. During stand-by mode, the condition of the facsimile system is constantly monitored by the slave CPU; whereas, upon detecting a predetermined signal for turning on of the main power supply such as an instruction signal to start transmission or reception and a telephone calling signal, the slave CPU turns the main power supply on and at the same time forces the slave CPU functionally dependent upon the master CPU, whereby the slave CPU operates in accordance with a command signal supplied from the master CPU. Then, upon completion of transmission or reception, the slave CPU shuts off the main power supply in response to a command signal supplied from the master CPU so that the stand-by monitoring mode is reestablished.

Figure 4:
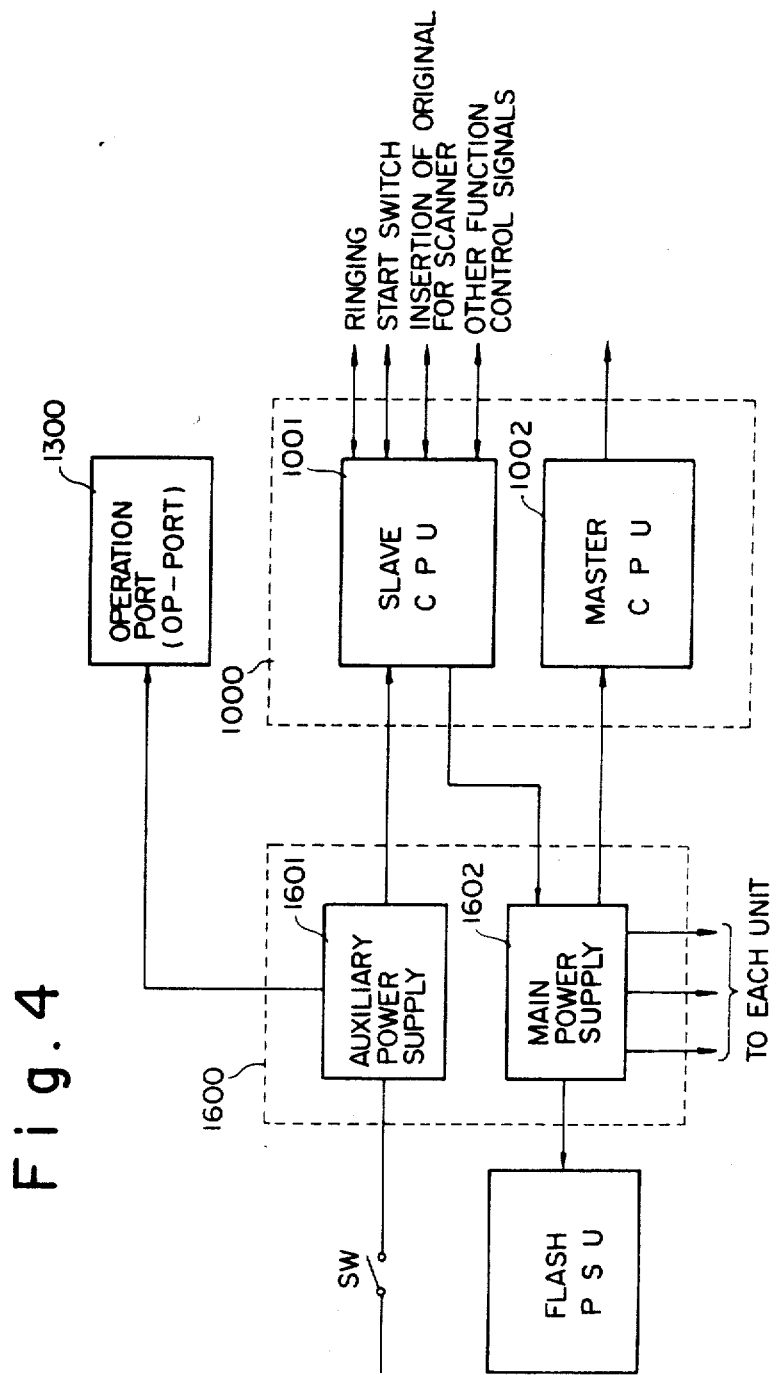
FIG. 4 is a block diagram showing the structure of the system control unit and the power supply unit in the facsimile system in accordance with one embodiment of the present invention.

FIG. 4 shows the basic structure of the system control unit 1,000 and the power supply unit 1,600 which constitute a part of the facsimile system in accordance with the present invention. As shown, the system control unit 1,000 includes a slave CPU 1,001 and a master CPU 1,002 and the power supply unit 1,600 includes an auxiliary power supply 1,601 and a main power supply 1,602. To the auxiliary power supply 1,601 is connected a power switch SW. It should be noted that like numerals indicate like elements as practiced throughout the specification.

Figure 5A:
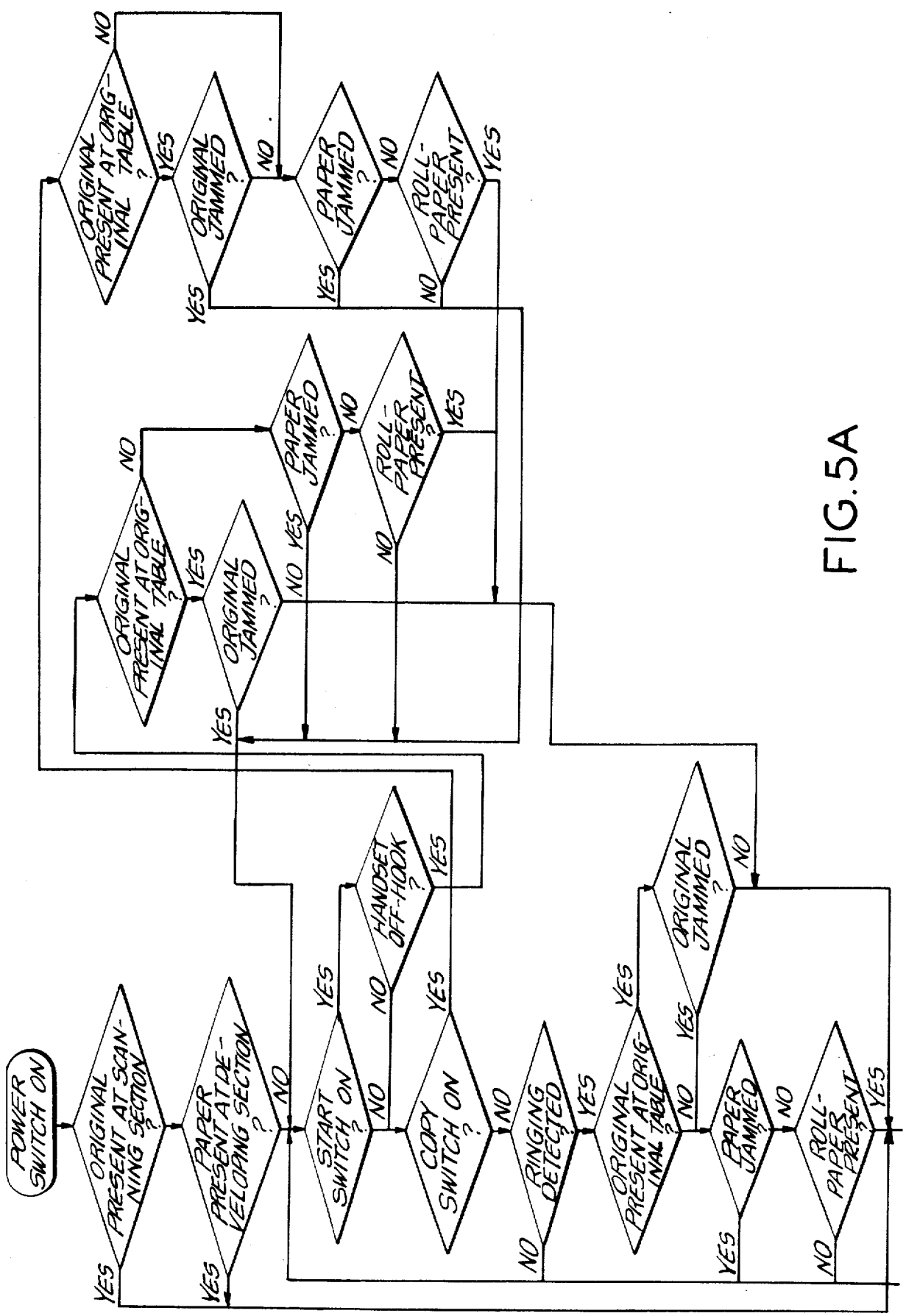
FIG. 5 is a flow chart showing the sequence of operation in accordance with one embodiment of the present invention.
Figure 5B:
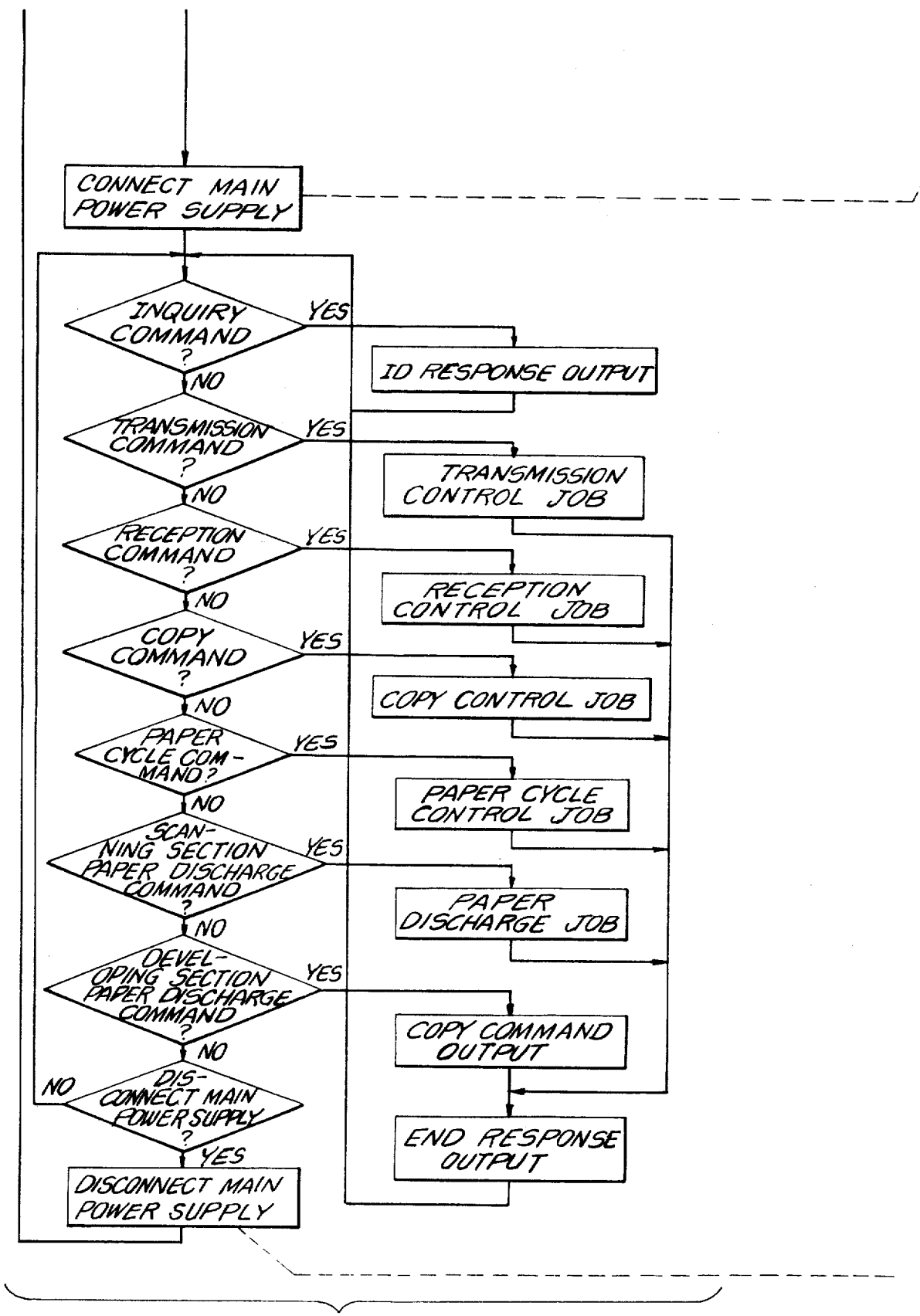
Figure 5C:
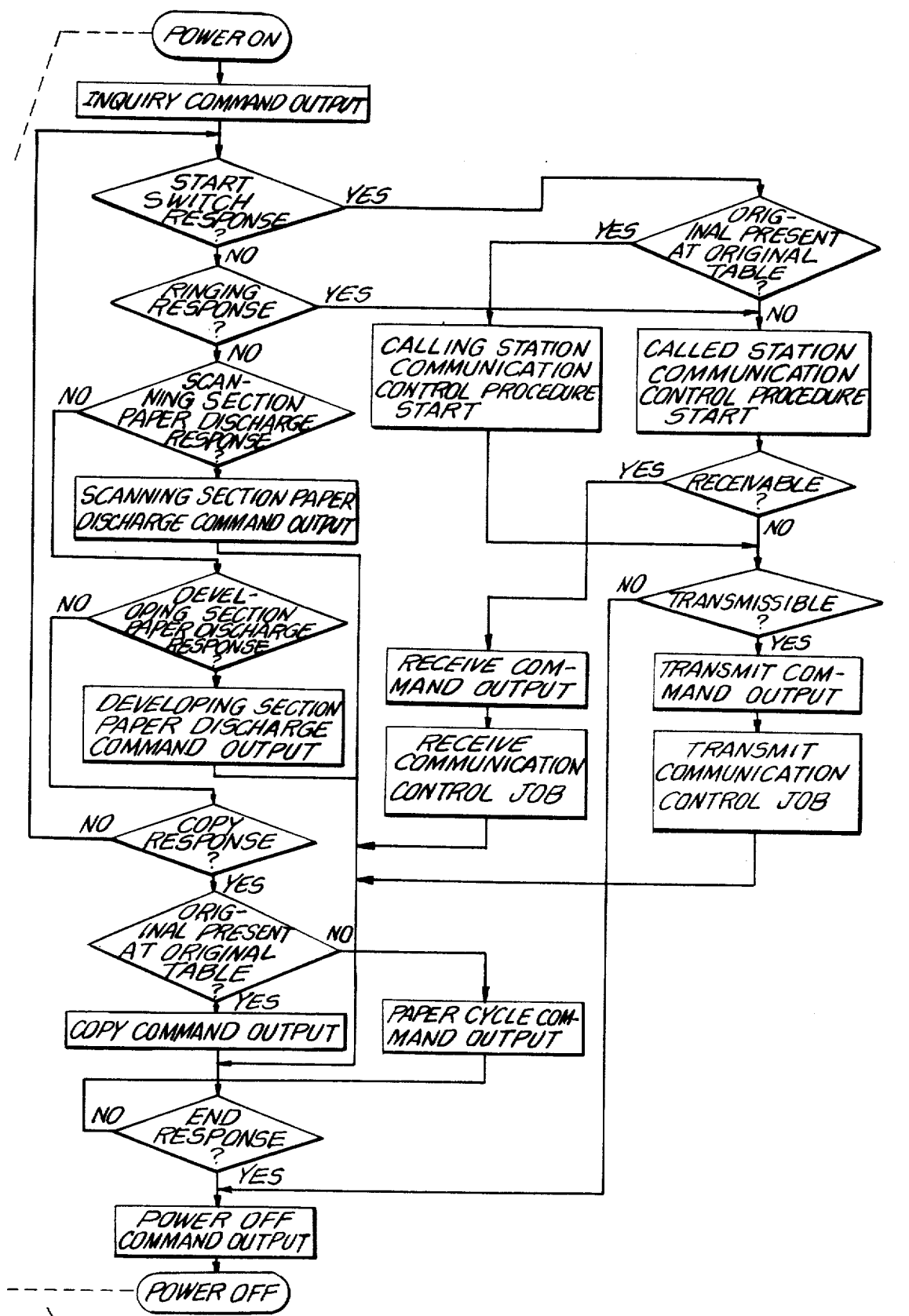

Now, the operation of this first embodiment of the present invention will be described. The following description will be better understood if reference is made to FIG. 5 which shows the sequence of operation of this first embodiment.

When the power switch SW is closed, only the auxiliary power supply 1,601 is turned on to set the slave CPU 1,001 in operative condition, thereby establishing a stand-by state. In this manner, the slave CPU 1,001 is made ready to detect the presence or absence of an original document at the scanner and of recording paper at the developing section. Thus, if an original document and/or recording paper exist at these locations because of accidental power failure or unintentional power shut-off while the facsimile system was in operation, they can be discharged upon re-activation of power.

Then an examination is made as to whether the start switch is on or not. With the start switch on, a transmitting mode is established if an original document is present; whereas, a receiving mode is established if an original document is absent. On the other hand, if the start switch is off, then it proceeds to the next step. If the start switch is on, then it is examined whether or not the telephone receiver is in an off-hook state, i.e., the telephone receiver being removed from the cradle. The purpose of this examination is to avoid the occurrence of operational failure due to the operation of the facsimile machine without an appropriate connection to the other facsimile machine to be communicated through a transmission line.

If the off-hook condition does not exist, then the copy switch is checked as to whether it is on or not. In the case where the copy switch is on, presence of an original document sets a copy cycle; whereas, absence of an original document sets a paper cycle. On the other hand, in the case where the copy switch is off, it proceeds to the next step and it is checked as to whether a ringing has been detected. Such a ringing is a calling tone from an exchanger. If the state of communication has been established by detecting a ringing, transmitting and receiving conditions are determined during the communication control procedure as instructed by the other facsimile machine now in communication. It then proceeds to the step of checking the presence or absence of paper jamming and then to the step of checking the presence or absence of a roll of paper, after checking the presence or absence of jamming of an original document only if there exists an original document.

The slave CPU 1,001 constantly monitors the condition of the facsimile system by going through the sequence of operation as described above. And, when the slave CPU 1,001 detects a predetermined cause for activating the main power supply, the main power supply is turned on, thereby making the master CPU 1,002 operative. When the master CPU 1,002 becomes operative, the slave CPU 1,001 is forced to be functionally dependent on the master CPU 1,002 and therefore the slave CPU 1,001 operates in accordance with instructions supplied from the master CPU 1,002, which corresponds to the bottom right section of the flow chart shown in FIG. 5.

Then the master CPU 1,002 supplies an inquiry command signal in order to determine the cause of activation of the main power supply. In response thereto, the slave CPU 1,001 supplies an identification response signal which carries the information of the cause. Such an identification response includes a start switch response, a ringing response, a copy response, a scanning section paper discharge response, and a developing section paper discharge response. Upon receipt of such a response signal, the master CPU 1,002 carries out a facsimile operation similar to that of prior art facsimile machines. Upon completion of the facsimile operation, the master CPU 1,002 issues a power-off command signal to have the slave CPU 1,001 turn the main power supply off. At the same time, this power-off command signal allows the slave CPU 1,001 to become independent of the master CPU 1,002 so that the stand-by mode is reestablished.

It should be noted that the slave CPU may share a particular control function such as controlling of the mechanism or structural parts of the facsimile system, if possible, in addition to the role of monitoring during a stand-by state.

The second embodiment of this invention is particularly directed to such sharing of functions between a pair of central processing units, which will be described more in detail hereinbelow. In accordance with the second embodiment of the present invention, the system control unit is comprised of a pair of CPU's; one CPU, e.g., master CPU, directed to the control function relating to protocol and other communication related matters and the function of generating command signals with respect thereto, and the other CPU, e.g., slave CPU, directed to the function of controlling the mechanism or structural parts of the facsimile machine. In this manner, the second embodiment of this invention is characterized in the division of function concerning the facsimile operation between a pair of CPU's. Such a structure is particularly useful since programs to be stored in the CPU's may be changed individually so that addition or modification of functions required for various types of the facsimile machine can be easily done.

It is to be noted that the second embodiment of the present invention has the structure shown in FIG. 4. Thus, when the power switch SW is turned on, only the auxiliary power supply 1,601 is actuated so that the slave CPU 1,001 becomes operative to establish a stand-by mode. Under the condition, the slave CPU 1,001 constantly monitors the condition of the facsimile system, and upon detection of an instruction signal to start transmission or reception, a telephone calling signal or other predetermined causes for activating the main power supply, it forces the main power supply 1,602 to be on. Thereafter, the master CPU 1,002 exercises the communication-related control; whereas, the slave CPU 1,001 exercises the mechanism or structural part-related control.

The functions shared by the slave CPU 1,001 are as indicated below.

(1) The control for feeding of an original document by the scanner during a transmitting mode which includes:

(a) designation of the drivement, stoppage and speed of the pulse motor;

(b) monitoring the occurrence of jamming of an original document; and (c) determination of the longest original document.

(2) The control for feeding of paper by the plotter during a receiving mode which includes:

(a) designation of the drivement, stoppage and speed of the pulse motor;

(b) determination and monitoring of the loop amount of paper;

(c) controlling of various clutches;

(d) monitoring of the occurrence of paper jamming;

(e) controlling the inverting operation of paper;

(f) monitoring the remaining amount of paper;

(g) ON/OFF control of the flash lamp; and (h) monitoring the existence of an obstruction to the flash lamp.

(3) The control for the scanner and the plotter during a copy mode.

(4) The ON/OFF control for the lamp at the operation port.

(5) The ON/OFF control for checking the fluorescent lamp in the machine.

In this manner, in accordance with this embodiment of the present invention, the slave CPU 1,001 shares the mechanism-related control; on the other hand, the master CPU 1,002 shares protocol and other communication-related control together with generation of command signals to the slave CPU 1,001. A main advantage in this embodiment is that the communication-related programs may be altered separately from the mechanism-related programs and thus adjustments to functional changes can be done with ease.

Figure 6A:
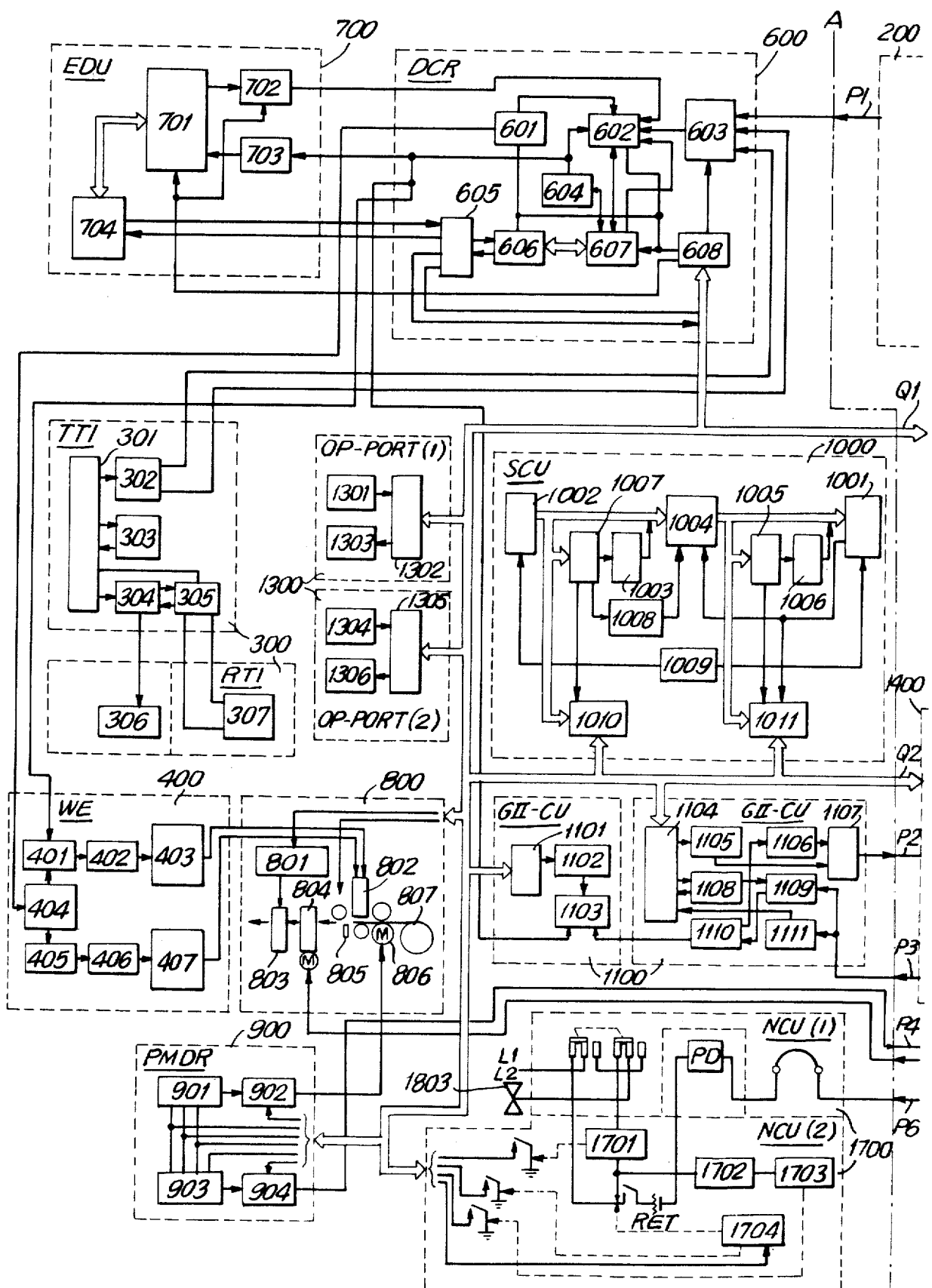
FIGS. 6A and 6B are block diagrams which should be combined along line A—A and which show, as an example, the detailed structure of the facsimile system when the present invention is applied.
Figure 6B:
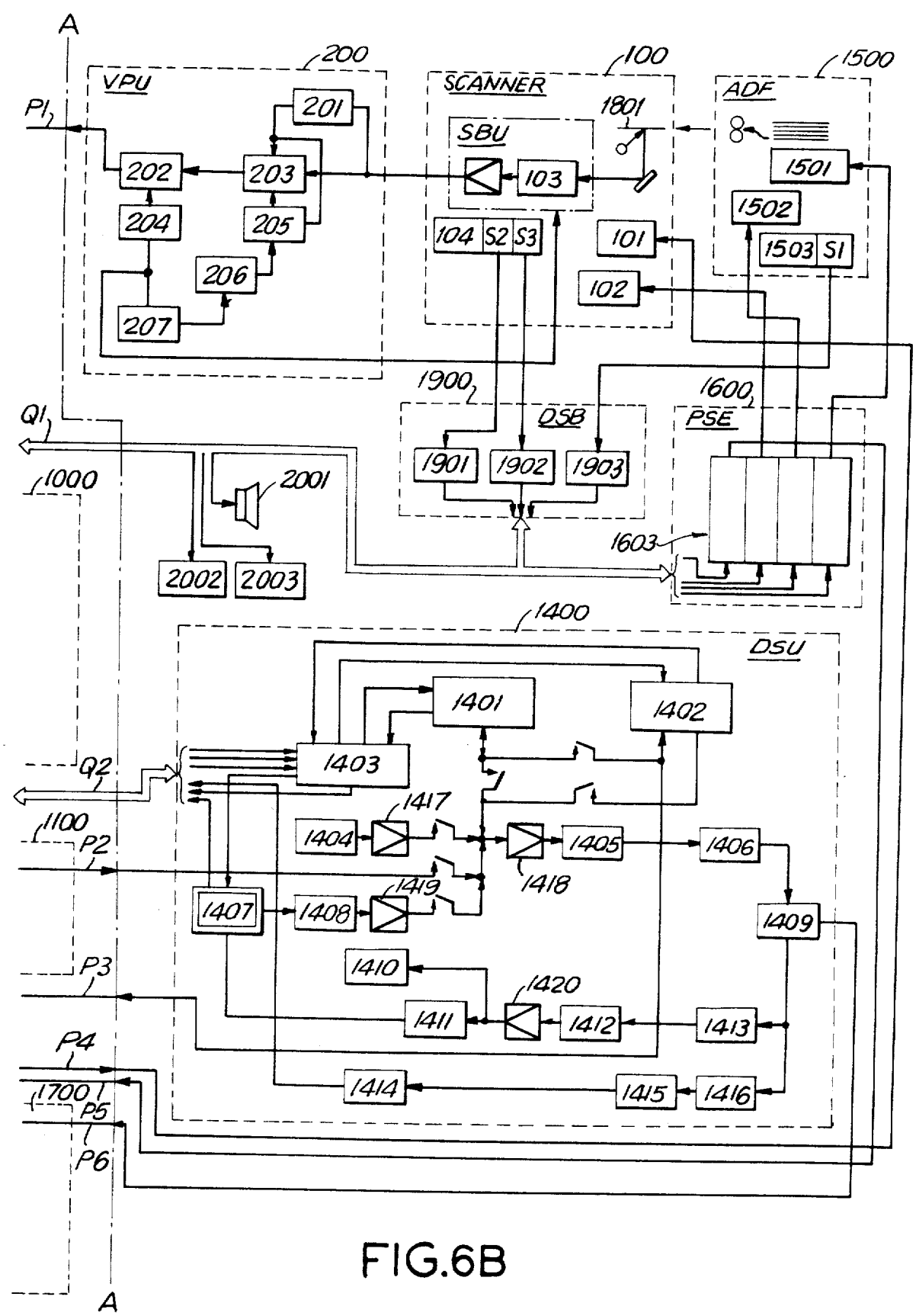

FIGS. 6A and 6B, when combined along line A—A, form a block diagram showing a detailed structure of the facsimile system embodying the present invention. In these figures, numeral 101 indicates a pulse motor; 102 reduction motor; 103 photoelectric converting element such as CCD; 104 sensor; 201 peak detector; 202 sampling unit; 203 two-value converter; 204 CCD-driven clock generator; 205 D/A converter; 206 ROM; 207 address counter; 301 CPU; 302 video memory; 303 quartz clock; 304 display memory; 305 serial interface circuit; 306 journal printer; 307 fluorescent display; 401 S-P converter; 402 level converter; 403 stylus high-voltage switching circuit; 404 write timing control circuit; 405 segment selector circuit; 406 level converter; 407 segment high-voltage switching circuit; 601 line buffer control unit; 602 line buffer; 603 input data switching unit; 604 color discrimination RL counter; 605 switching unit; 606 message buffer; 607 one-chip microprocessor (CPU); 608 command decoder; 701 microprocessor (CPU); 702 RL generator; 703 mode detector; 704 message buffer; 801 high-voltage power supply; 802 stylus-segment electrode; 803 fixing section; 804 developing section; 805 cutter; 806 pulse motor; 807 recording paper; 901 step speed control circuit; 902 switching circuit; 903 step speed control circuit; 904 switching circuit; 1,003 ROM; 1,004 hand-shake interface circuit; 1,005 address latch circuit; 1,006 ROM; 1,007 address latch circuit; 1,008 hand-shake controller; 1,009 clock generator; 1,010, 1,011 and 1,101 I/O port; 1,102 data control unit; 1,103 data memory; 1,104 I/0 port; 1,105 tonal signal generator; 1,106 modulator; 1,107 signal selector circuit; 1,108 synchronizing signal generator; 1,109 demodulator; 1,110 data sampling unit; 1,111 tonal signal detector; 1,301 operation port (OP-PORT); 1,302 controller; 1,303 display; 1,304 operating unit; 1,305 controller; 1,306 display; 1,401 M48 type MODEM; 1,402 V96P type MODEM; 1,403 data selector; 1,404 and 1,405 low-pass filter; 1,406 attenuator; 1,407 V21 type MODEM; 1,408 low-pass filter; 1,409 HYB; 1,410 carrier detector; 1,411 limiter; 1,412 BPF; 1,413 high-pass filter; 1,414 462-Hz detector; 1,415 limiter; 1,416 BPF; 1,417-1,420 amplifiers; 1,501 fan motor for separation of an original document; 1,502 original document transporting motor; 1,503 sensor; 1,603 zero-cross A.C. switch; 1,701 off-hook detecting relay; 1,702 rectifier; 1,703 ring detecting relay; 1,704 D.C. circuit close-coupling relay; 1,900 DSB; 1,901-1,903 comparators; 2,001 speaker; 2,002 receiving counter; and 2,003 transmitting counter. Reference characters P1-P6 and Q1 and Q2 in FIGS. 6A and 6B indicate matching points between the two figures.

Figure 7A:
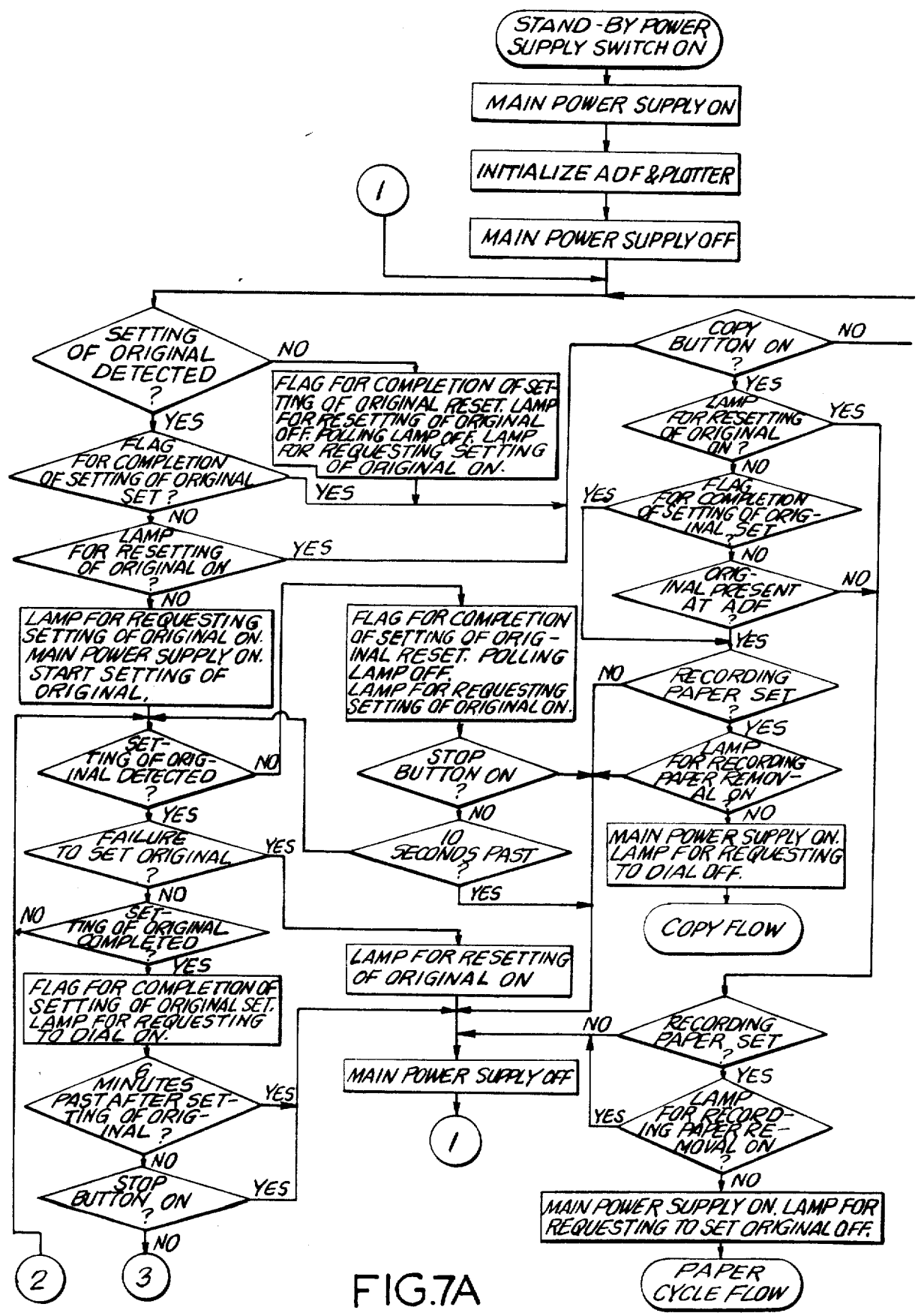
FIGS. 7A and 7B are flow charts which show the sequence of operation of the system shown in FIGS. 6A and 6B.
Figure 7B:
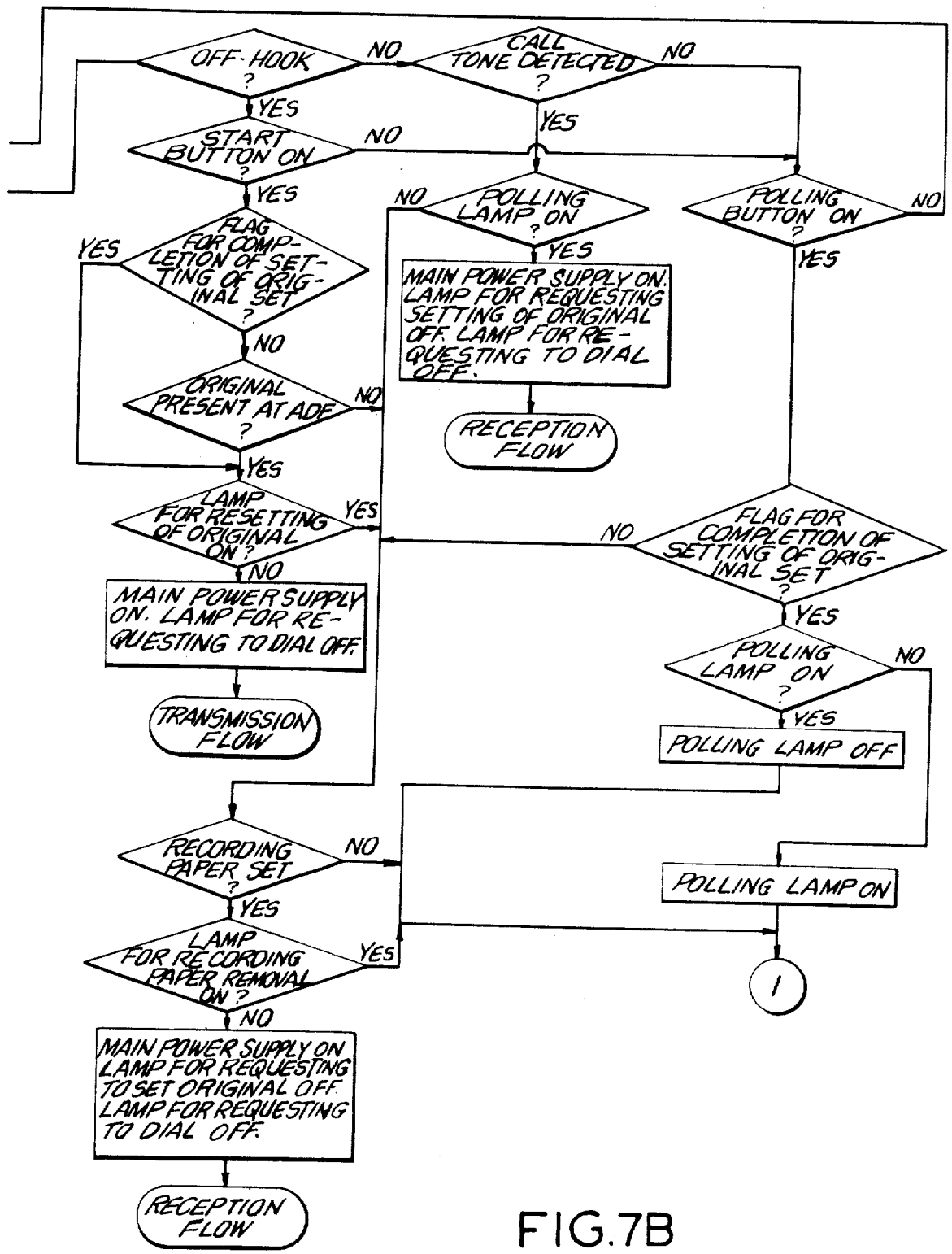
Figure 7C:
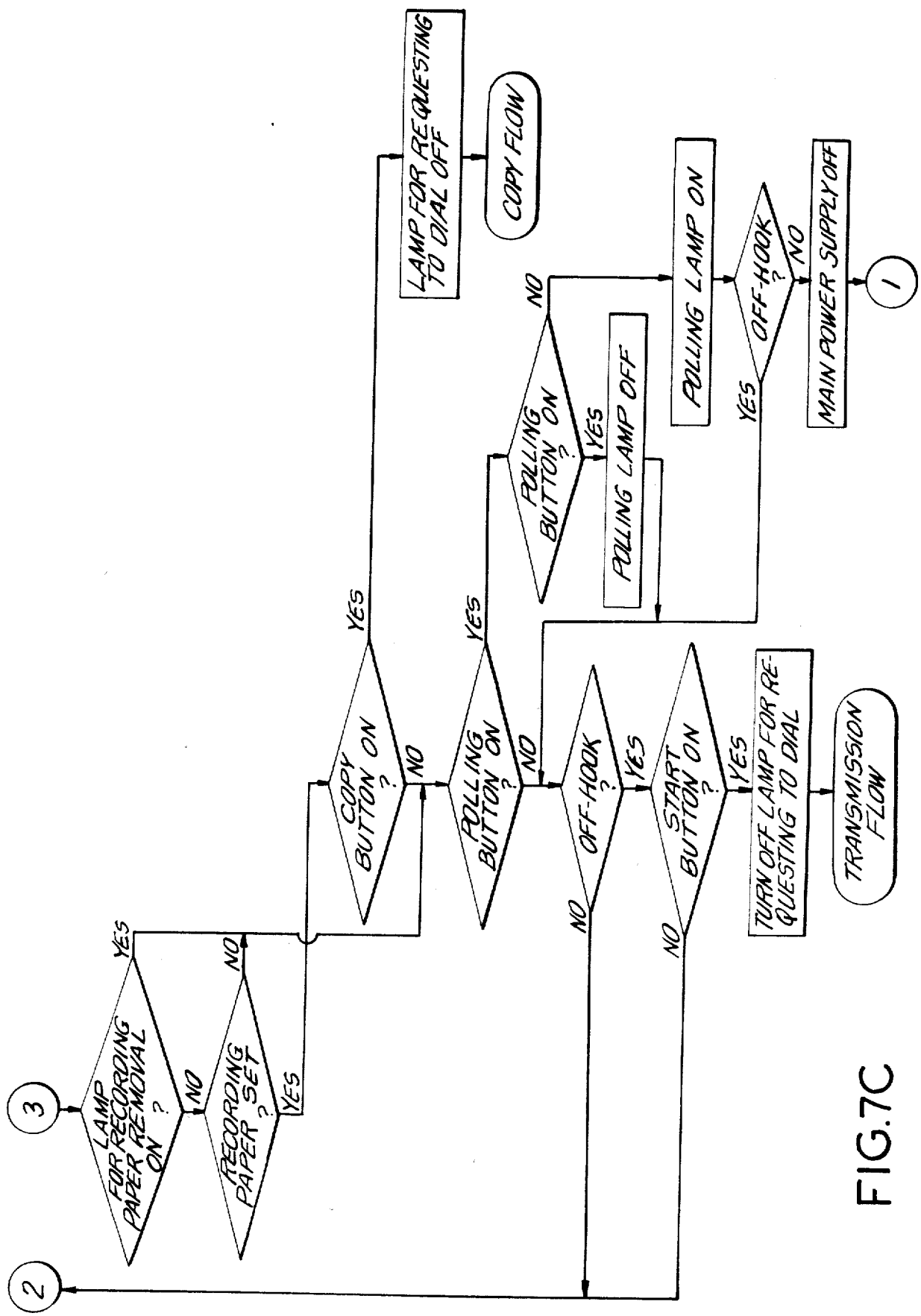

FIGS. 7A and 7B show in the form of a flow chart the sequence of operation of the facsimile system of FIGS. 6A and 6B. As shown at top center of FIG. 7A, when the power switch SW of FIG. 4 is turned on, the slave CPU 1,001 turns the main power supply 1,602 on to bring the master CPU 1,002 into operative condition. Then, in accordance with instructions from the master CPU 1,002, the main power supply is temporarily shut off after initializing the automatic document feeder and the plotter. Thus, the slave CPU 1,001 is made independent of the master CPU 1,002, thereby beginning to monitor the facsimile system in a stand-by state.

First, as shown in the left-most column in FIG. 7A, it is checked as to whether an original document is set or not. If an original document is set, then it is checked as to whether such a setting is completed, whether a flag is set, whether the original document reset lamp is on, etc. If one of the results of these checks is affirmative, or YES, then it moves to the top of the third column from the left. At this time, if the copy button is on, then it is checked as to whether the original document resetting lamp is on, whether the flag for completion of original document setting is set, whether an original document is present at the automatic document feeder, etc. On the other hand, if the copy button is not on, then it proceeds to the top of the fourth column from the left. First, it is checked as to whether an off-hook condition exists. If it does exist, then it is checked as to whether the start button is on, whether the flag for completion of original document setting is set, etc.

On the other hand, if the off-hook condition does not exist, then it proceeds to the top of the fifth column from the left and it is checked as to whether a calling tone is detected. If the answer is affirmative, then it is examined as to whether the polling lamp is on. The on-condition of the polling lamp indicates the execution of polling communication so that the main power supply is turned on. In the case of absence of a calling tone, it proceeds to the top of the right-most column and the checking sequence follows as to whether the polling button is on, whether the flag for completion of original document setting is set, etc. If the polling button is not on, it goes back to the top of the left-most column and the checking sequence follows.

In the combined flow chart of FIGS. 7A and 7B, the slave CPU 1,001 makes judgements until the step of "MAIN POWER SUPPLY ON" is reached. Upon activation of the main power supply, the slave CPU 1,001 is made subordinate to the master CPU 1,002 and it handles the mechanism-related control under the control of the master CPU 1,002, which also handles the communication-related control.

Figure 8A:
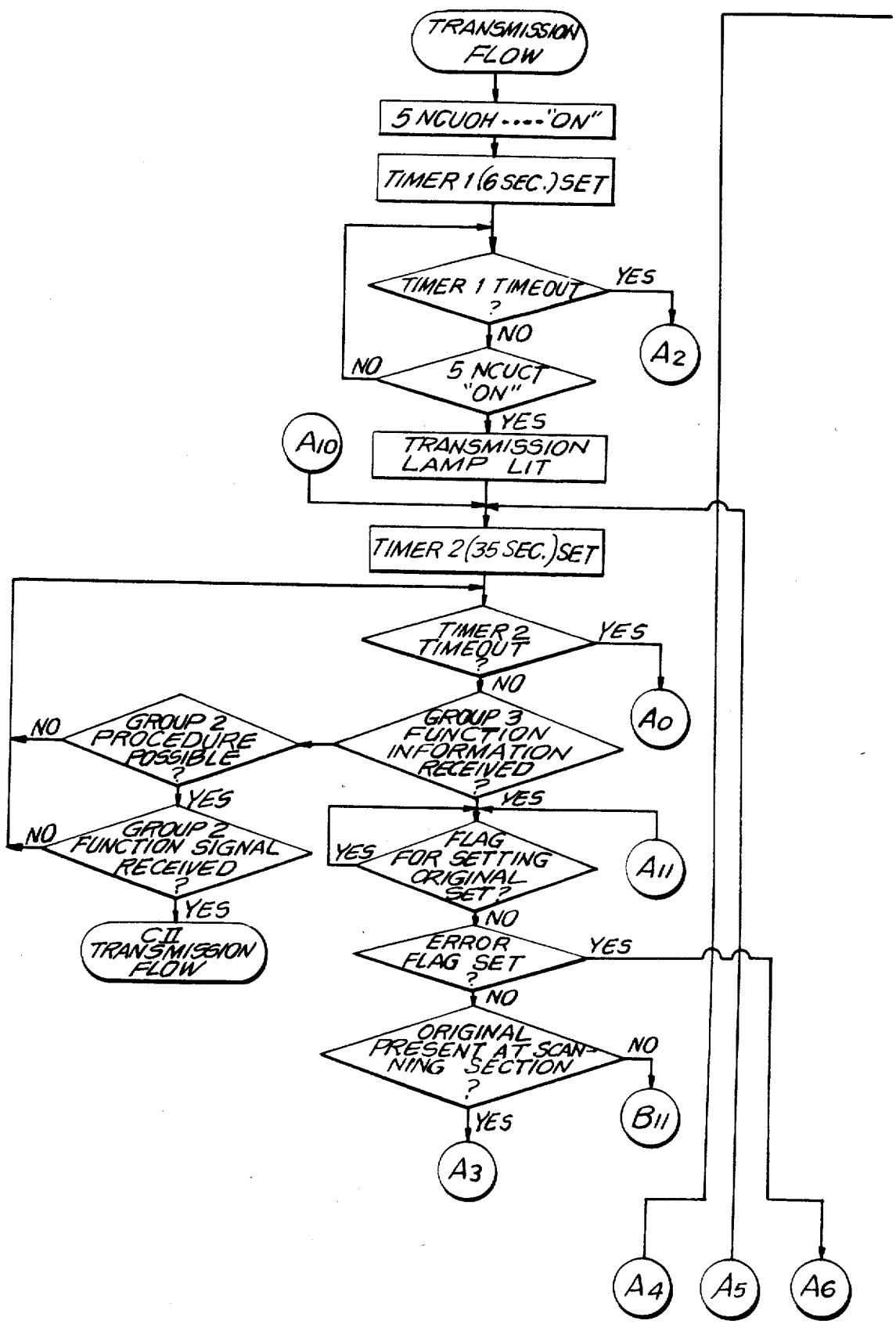
FIGS. 8A through 8C are flow charts showing the detailed sequence of operation of the system shown in FIGS. 5A and 5B when the system is in a transmitting mode.
Figure 8B:
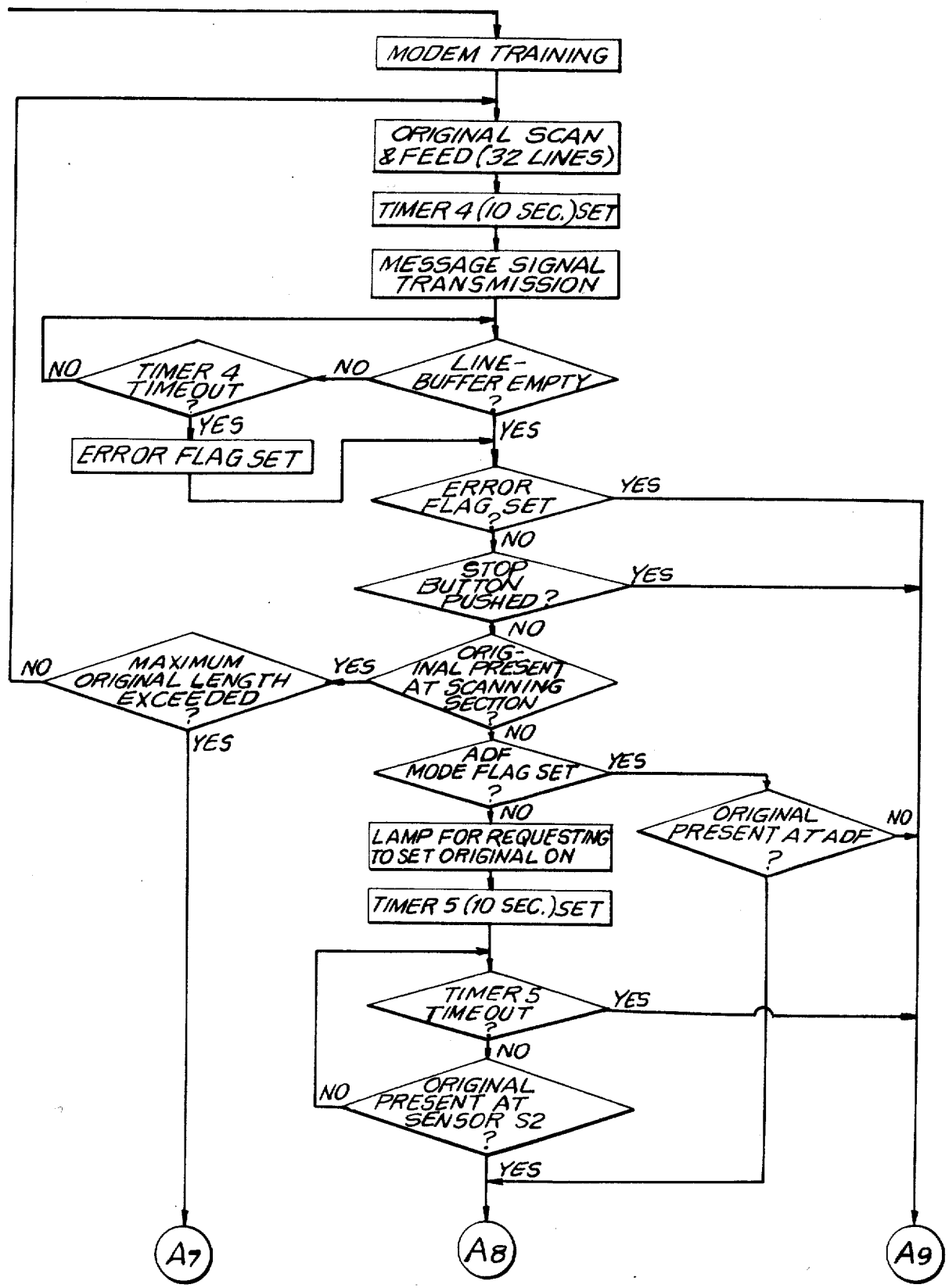
Figure 8C:
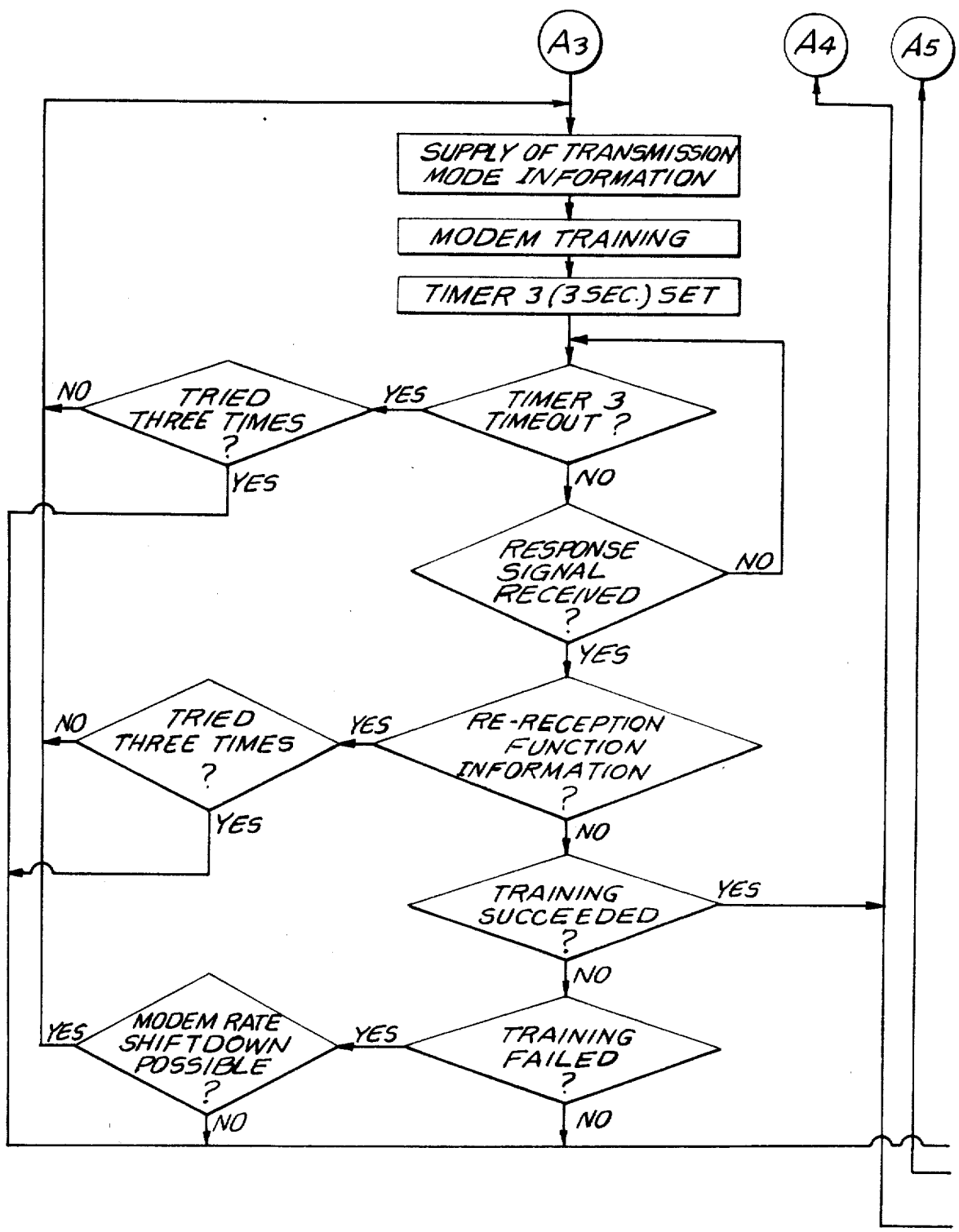
Figure 8D:
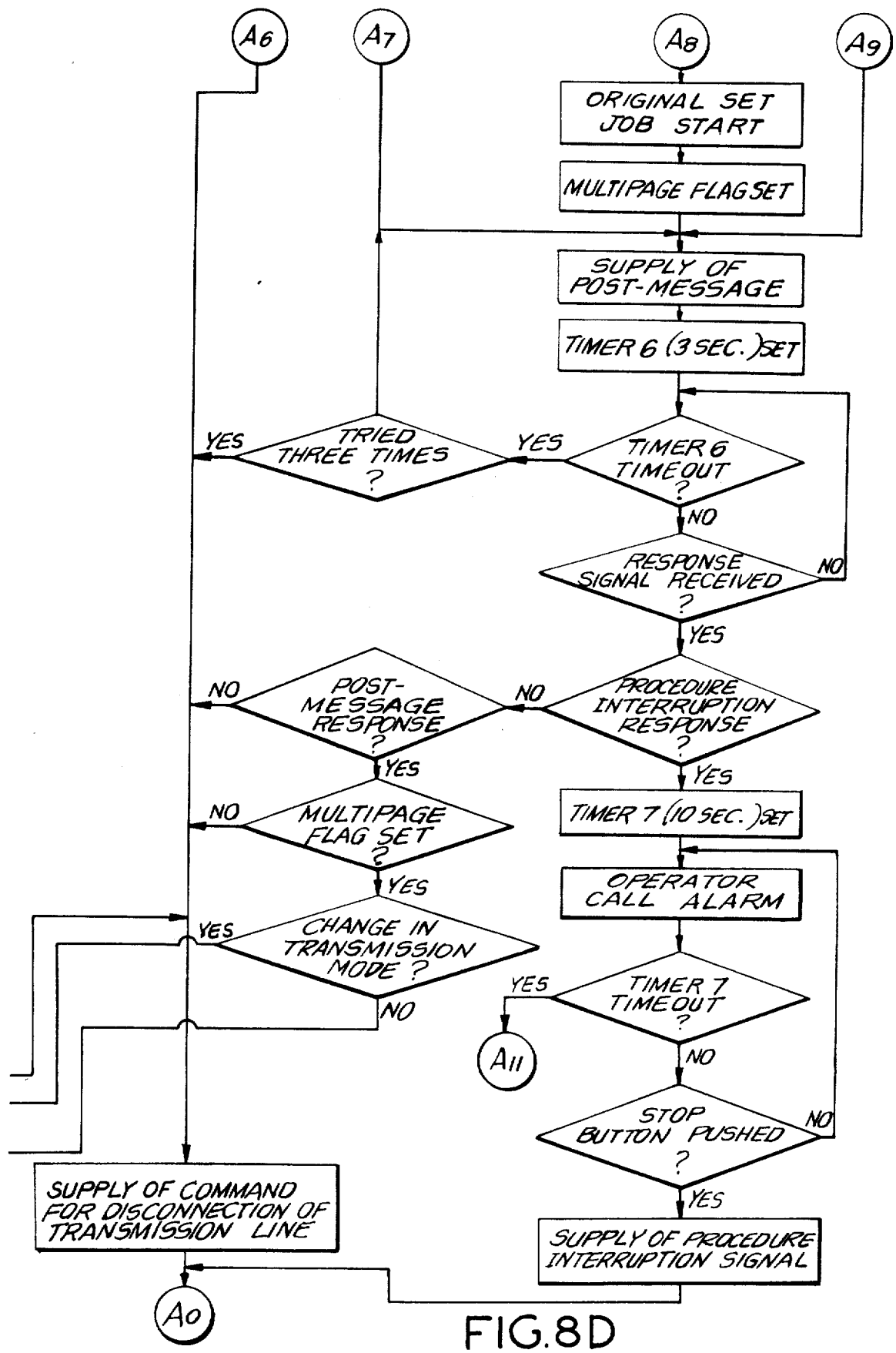
Figure 9A:
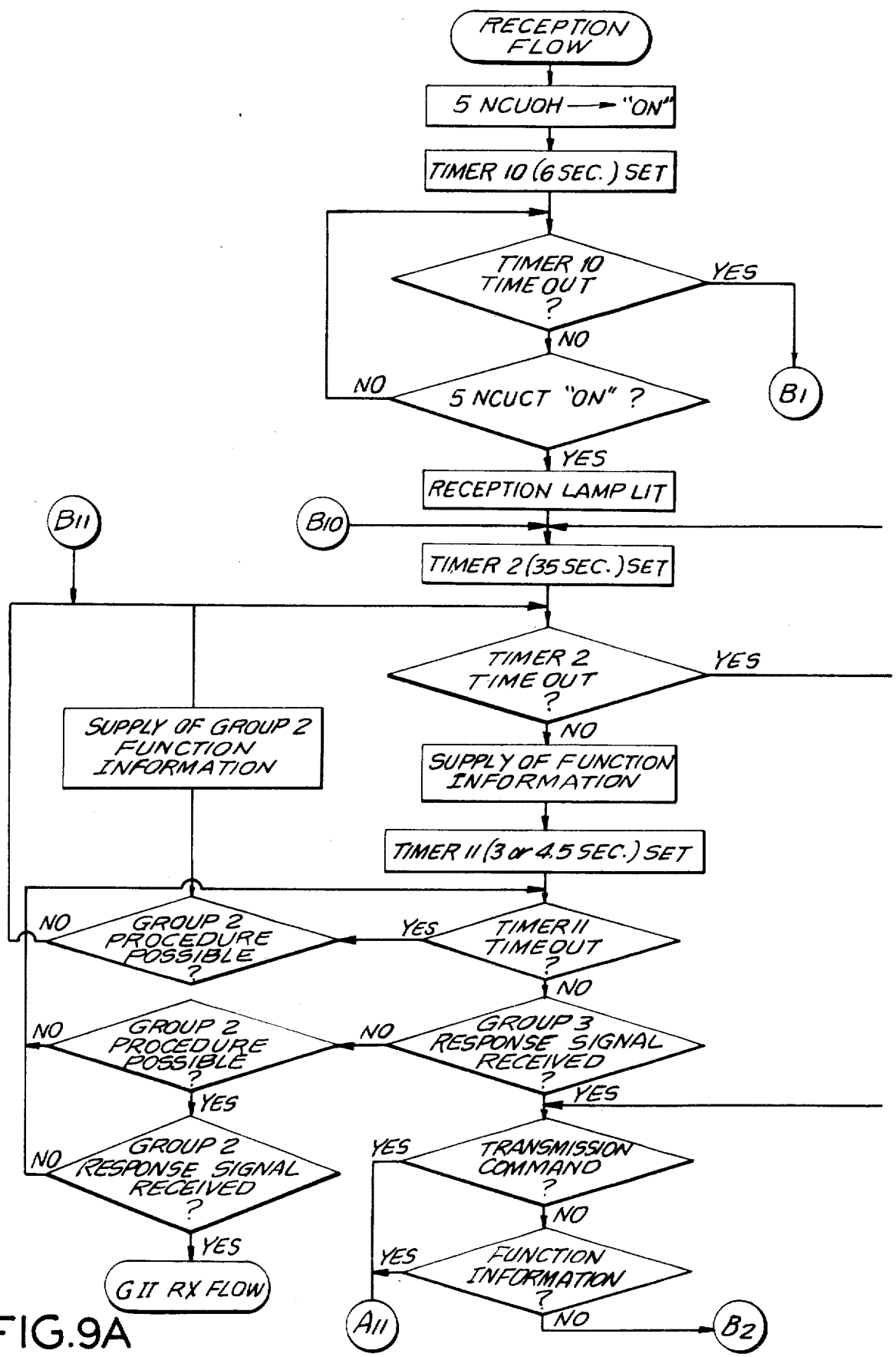
FIGS. 9A through 9C are flow charts showing the detailed sequence of operation of the system shown in FIGS. 5A and 5B when the system is in a receiving mode.
Figure 9B:
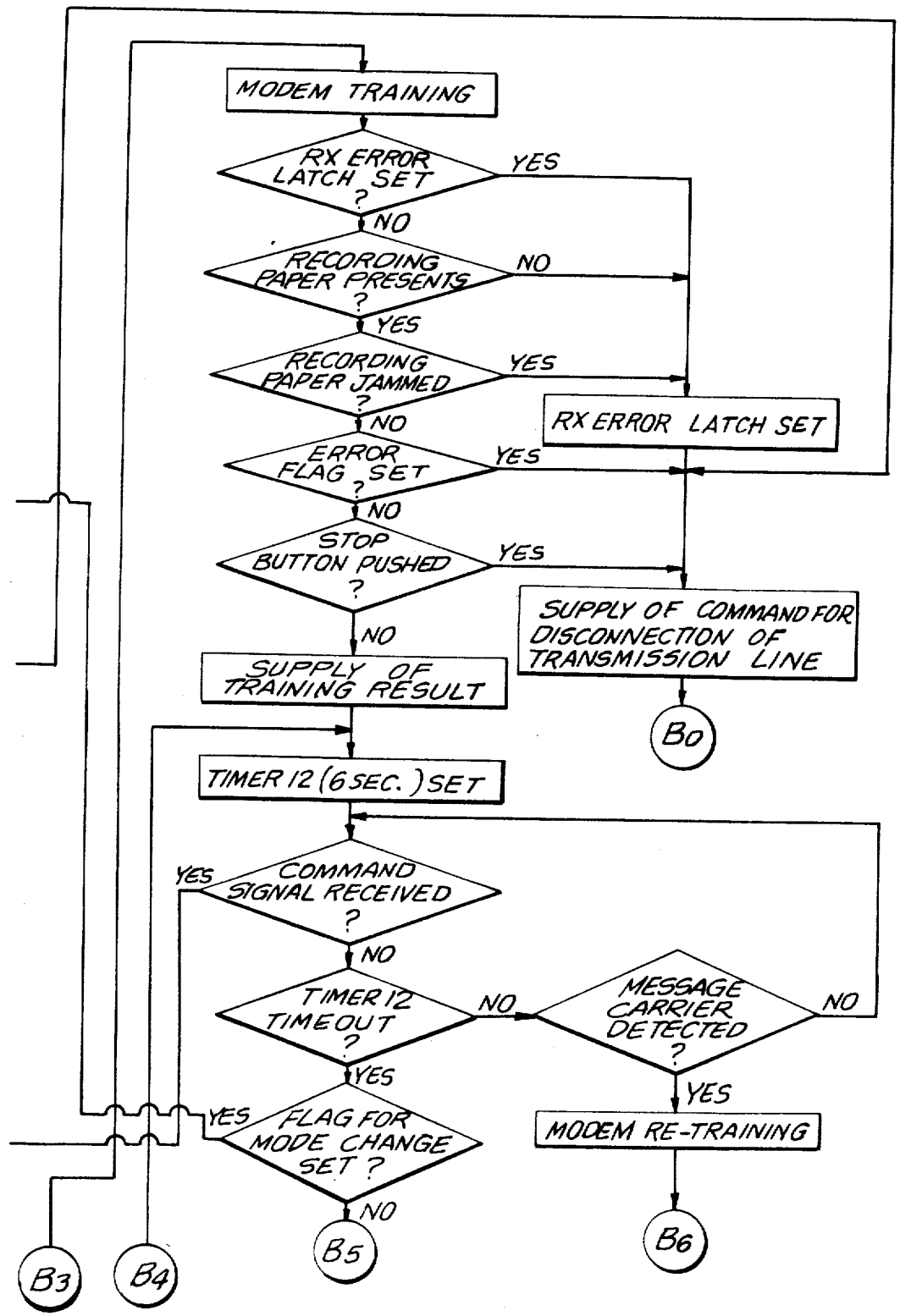
Figure 9C:
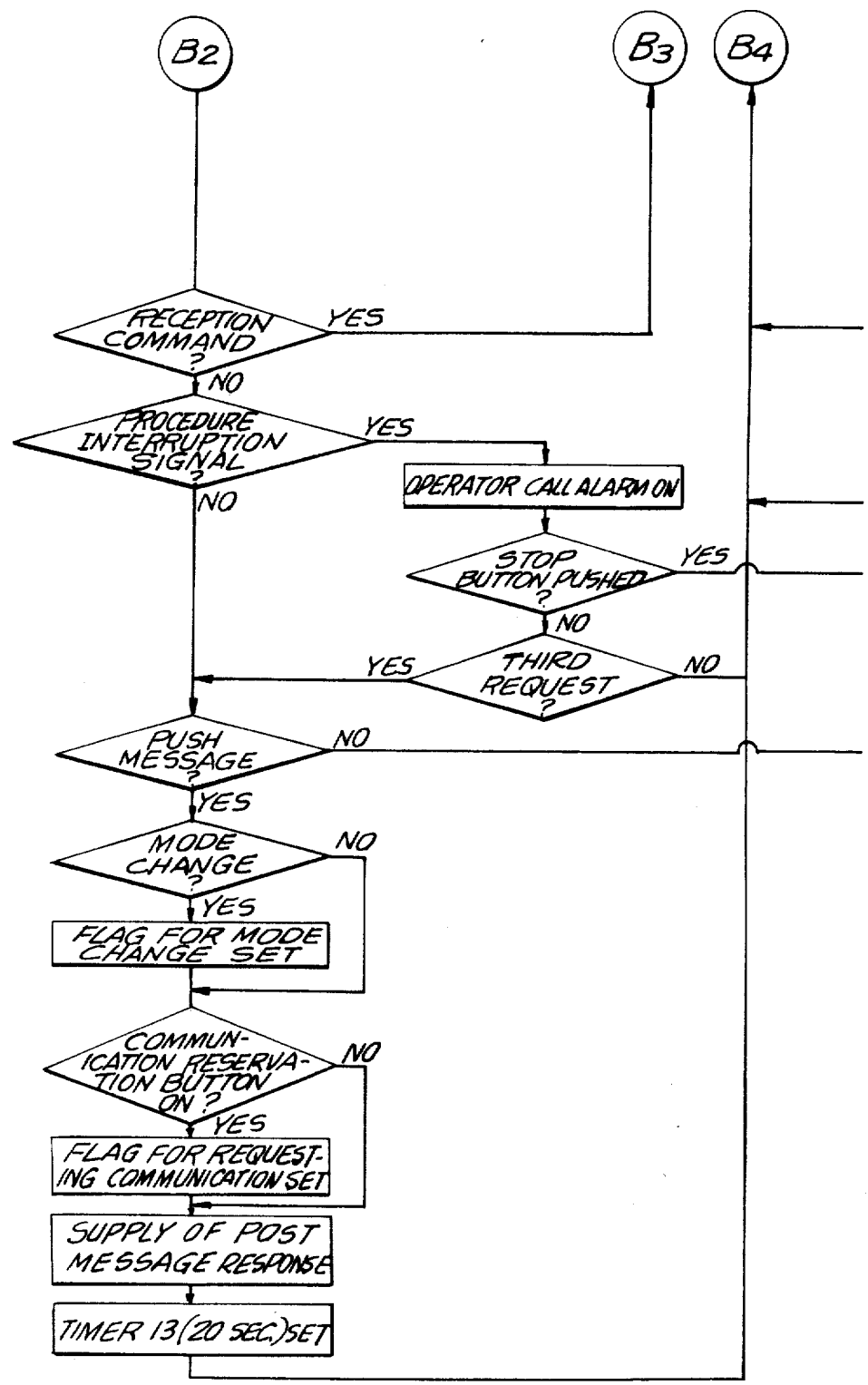
Figure 9D:
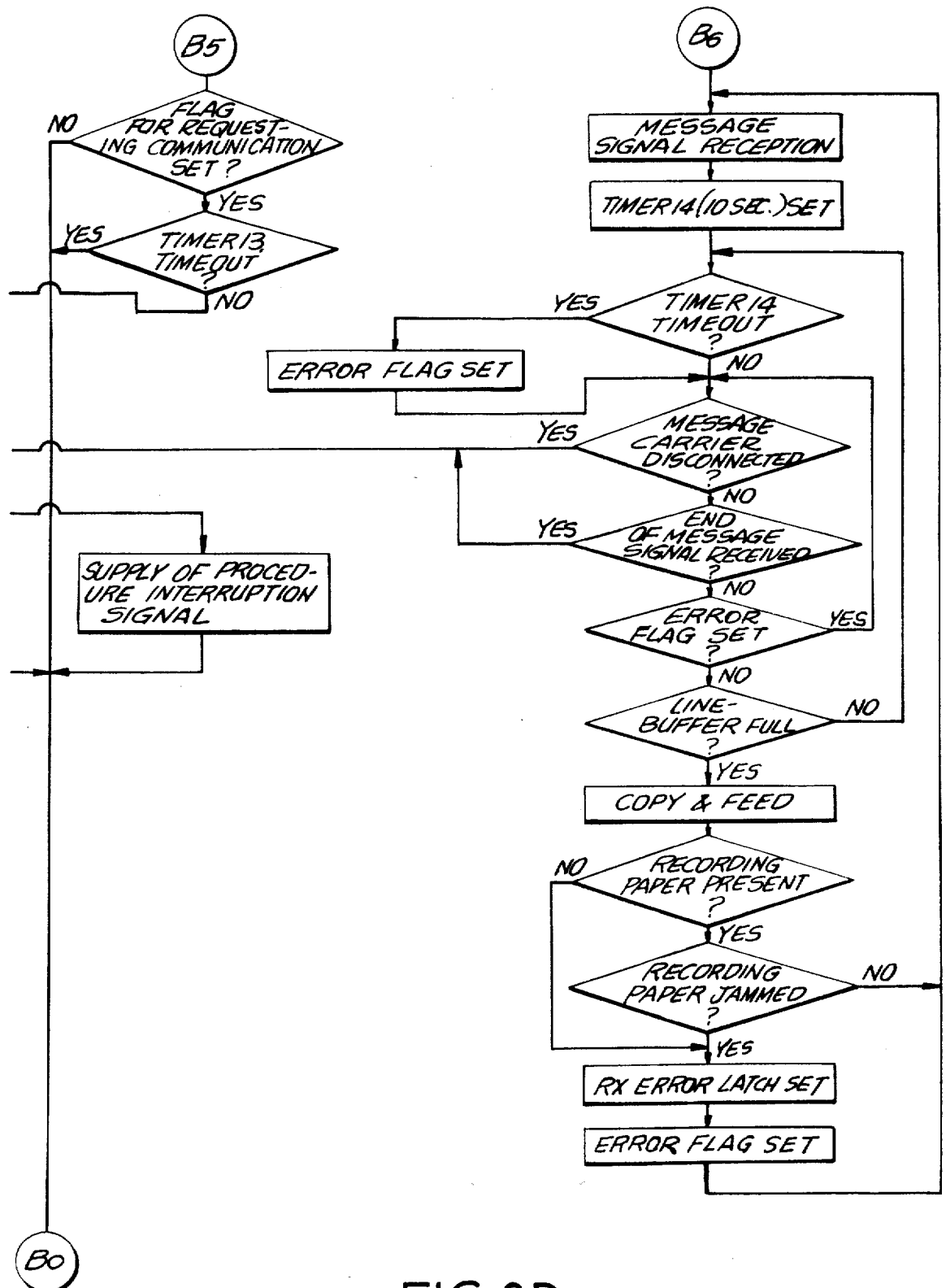
Figure 10A:
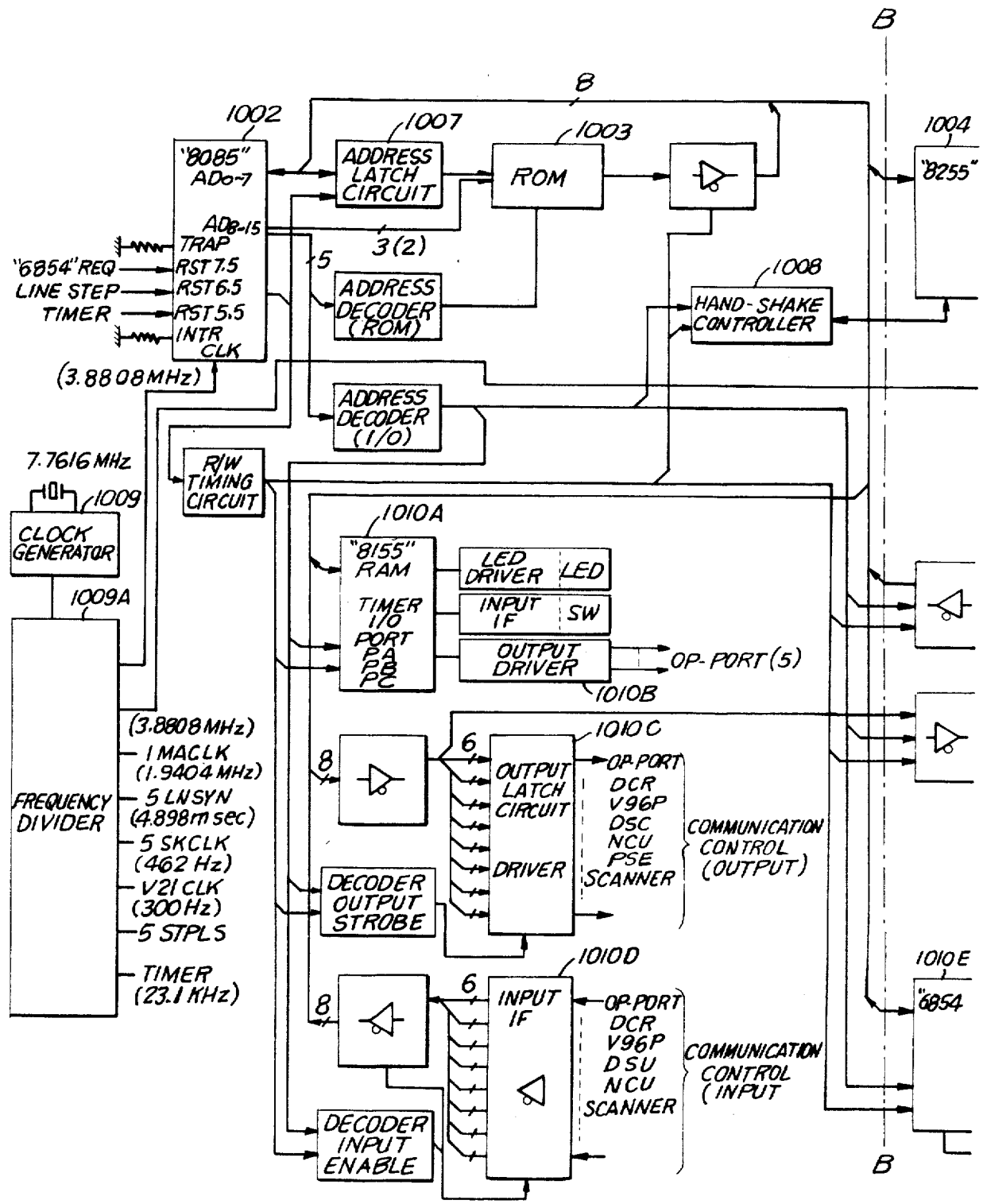
FIGS. 10A and 10B are block diagrams which should be combined along line B—B and which show the detailed structure of the system control unit when the present invention is applied.
Figure 10B:
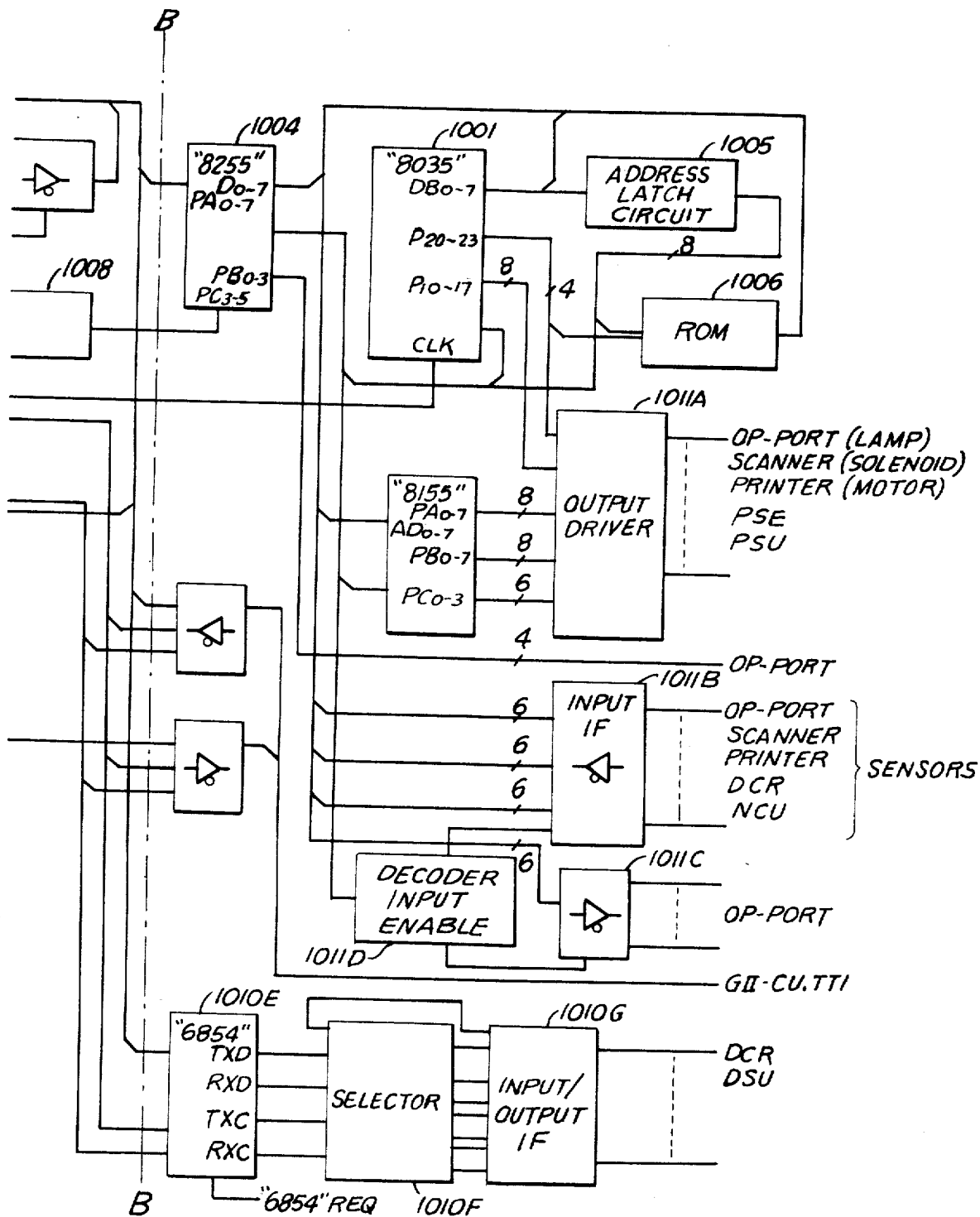

FIGS. 8A through 8C, when combined, show a detailed flow chart of the transmission flow indicated in FIGS. 7A and 7B. Similarly, FIGS. 9A through 9C, when combined, show a detailed flow chart of the reception flow indicated in FIGS. 7A and 7G. Furthermore, FIGS. 10A and 10B, when combined, show a block diagram illustrating a detailed structure of the system control unit 1,000 shown in FIG. 6A.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An apparatus for controlling a facsimile system comprising a main power supply, an auxiliary power supply, switch means for controlling the on/off condition of said auxiliary power supply, a first central processing unit (CPU) to which power is supplied from said main power supply which is turned on only during the operation of transmitting or receiving image signals and a second central processing unit (CPU) to which is normally supplied power from said auxiliary power supply when turned on by said switch means, whereby said second CPU monitors in a monitoring mode the condition of the facsimile system while it is in a stand-by state and in response to a command signal for the initiation of transmission or reception of image sigsnals or a telephone calling signal, said second CPU causes said main power supply to be turned on thereby causing said first CPU to be operatively connected to said main power supply and making said second CPU functionally dependent upon said first CPU whereas, upon completion of the transmitting or receiving operation, said second CPU causes said main power supply to be turned off thereby causing said first CPU to be operatively disconnected from said main power supply in response to an instruction signal supplied from said first CPU, thereby reestablishing the monitoring mode, and, wherein said first CPU supplies an inquiry command signal to said second CPU upon being connected to said main power supply, said inquiry command signal inquiring as to the causes of the connection to said main power supply.

2. The apparatus of claim 1, wherein said second CPU supplies an identification response signal in response to said inquiry command signal, said identification signal carrying the information as to the cause of connection to said main power supply.

3. The apparatus of claim 2 wherein said identification response signal comprises a start switch response, ringing response, copy response, scanning section paper discharge response and developing section paper discharge response.

4. A facsimile machine for transmitting or receiving image signals through a transmission line connected thereto, comprising:
a main power supply;
an auxiliary power supply;
switch means for controlling the on/off condition of said auxiliary power supply;
a first central processing unit (CPU) which receives power from said main power supply at least during the transmitting or receiving operation for controlling the operation of data communication when said main power supply is turned on; and
a second central processing unit (CPU) which normally receives power from said auxiliary power supply when it is turned on by said switch means for controlling the operation of the mechanism of said machine and the on/off condition of said main power supply, said second CPU being forced to be functionally dependent on said first CPU when said main power supply is turned on by said second CPU and said first CPU is operatively connected to receive power from said main power supply;
wherein said first CPU supplies an inquiry command signal to said second CPU upon being connected to said main power supply, said inquiry command signal inquiring as to the causes of the connection to said main power supply.

5. The machine of claim 4 wherein said second CPU monitors the condition of said machine while said machine is in a stand-by state.

6. The machine of claim 4 wherein said mechanism controlling operation by said second CPU comprises the feeding of an original document by a scanner during a transmitting mode which includes:
(a) designation of the drivement, stoppage and speed of a pulse motor;
(b) monitoring the occurrence of jamming of an original document; and
(c) determination of a longest original document.

7. The machine of claim 4 wherein said mechanism controlling operation by said second CPU comprises the feeding of paper by a plotter during a receiving mode which includes:
(a) designation of the drivement, stoppage and speed of a pulse motor;
(b) determination and monitoring of the loop amount of paper;
(c) controlling of various clutches;
(d) monitoring of the occurrence of paper jamming;
(e) controlling the inverting operation of paper;
(f) monitoring the remaining amount of paper;
(g) ON/OFF control of a flash lamp; and
(h) monitoring the existence of an obstruction to a flash lamp.

8. The machine of claim 4 wherein said mechanism controlling operation by said second CPU comprises the controlling of a scanner and a plotter during a copy mode.

9. The machine of claim 4 wherein said mechanism controlling operation by said second CPU comprises the ON/OFF control of a lamp at an operation port.

10. The machine of claim 4 wherein said mechanism controlling operation by said second CPU comprises the ON/OFF control for checking a fluorescent lamp in said machine.

* * * * *